United States Patent
Onose et al.

(10) Patent No.: US 12,467,866 B2
(45) Date of Patent: Nov. 11, 2025

(54) FLUORESCENCE POLARIZATION IMMUNOASSAY METHOD AND FLUORESCENCE POLARIZATION IMMUNOASSAY DEVICE

(71) Applicant: TIANMA JAPAN, LTD., Kanagawa (JP)

(72) Inventors: Sho Onose, Kanagawa (JP); Ayuko Imai, Kanagawa (JP); Ken Sumiyoshi, Kanagawa (JP)

(73) Assignee: TIANMA JAPAN, LTD., Kanagawa (JP)

( * ) Notice: Subject to any disclaimer, the term of this patent is extended or adjusted under 35 U.S.C. 154(b) by 242 days.

(21) Appl. No.: 18/472,479

(22) Filed: Sep. 22, 2023

(65) Prior Publication Data

US 2024/0118206 A1    Apr. 11, 2024

(30) Foreign Application Priority Data

Sep. 29, 2022 (JP) ................ 2022-156079

(51) Int. Cl.
  *G01N 21/64* (2006.01)
  *G01N 33/58* (2006.01)
  *G01N 33/53* (2006.01)

(52) U.S. Cl.
  CPC ....... *G01N 21/6445* (2013.01); *G01N 33/582* (2013.01); *G01N 21/64* (2013.01); *G01N 21/6428* (2013.01); *G01N 33/53* (2013.01)

(58) Field of Classification Search
  CPC .. G01N 21/6445; G01N 33/582; G01N 21/64; G01N 21/6428; G01N 33/53; G01N 2021/6439
  See application file for complete search history.

(56) References Cited

U.S. PATENT DOCUMENTS

| | | | |
|---|---|---|---|
| 6,482,601 B1* | 11/2002 | Nasir | G01N 33/542 530/389.1 |
| 2009/0023595 A1 | 1/2009 | Yamagata | |
| 2021/0063310 A1* | 3/2021 | Shirokawa | G01N 21/6445 356/364 |
| 2021/0341488 A1* | 11/2021 | Fukuyama | G01N 33/582 436/501 |

FOREIGN PATENT DOCUMENTS

JP       2011-047802 A    3/2011

OTHER PUBLICATIONS

Hendrickson et al, "Fluorescence Polarization-Based Bioassays: New Horizons", Dec. 2020, Sensors, 20, pp. 1-33 (Year: 2020).*

* cited by examiner

*Primary Examiner* — Michelle M Iacoletti
*Assistant Examiner* — Judy Dao Tran
(74) *Attorney, Agent, or Firm* — Sughrue Mion, PLLC

(57) ABSTRACT

A degree of polarization of second reference samples produced by adding an antibody, a tracer, and a target substance having mutually different concentrations to a first reference sample not including the target substance is corrected with a degree of polarization of the first reference sample to generate a first calibration curve. A degree of polarization of a second sample to be measured produced by adding the antibody and the tracer to a first sample to be measured in amounts equal to those added to the second reference samples is corrected with a degree of polarization of the first sample to be measured to obtain the concentration of the target substance in the first calibration curve.

6 Claims, 13 Drawing Sheets

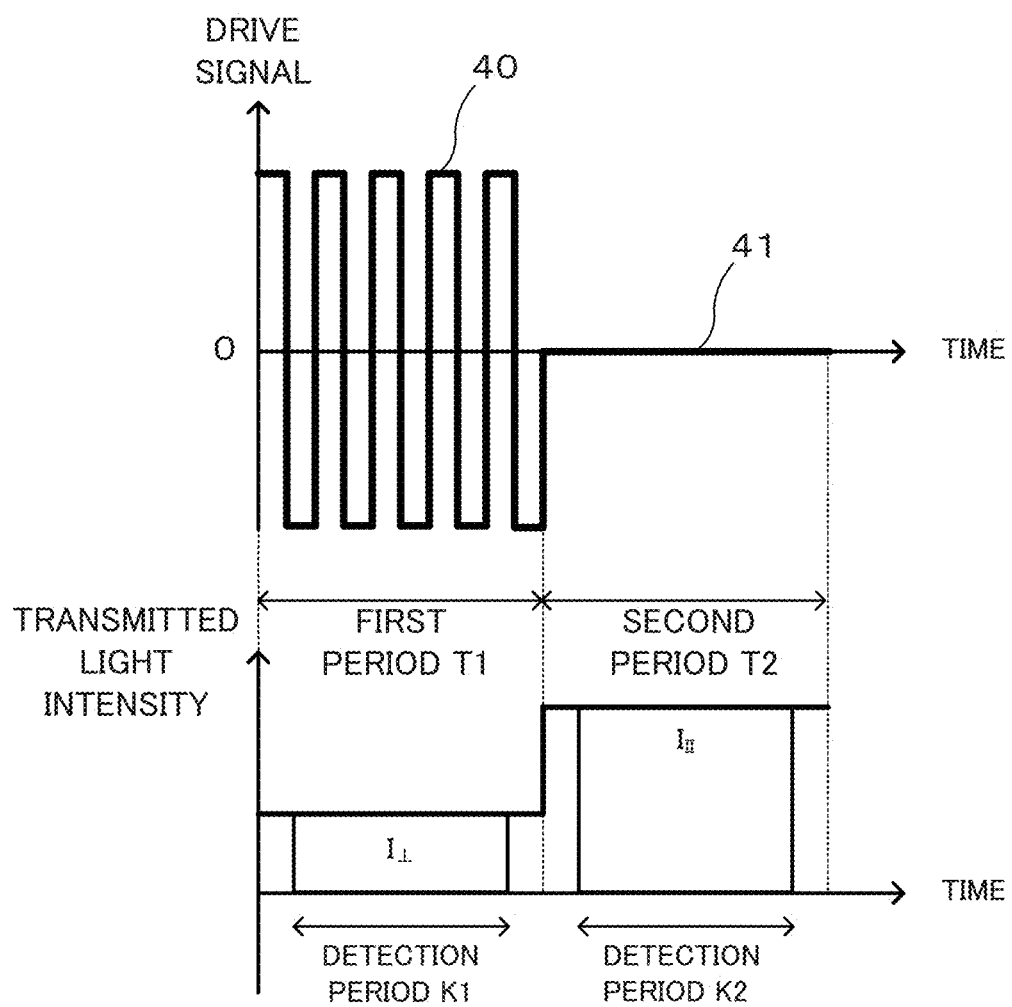

FISH SAUCE (FIVE-FOLD DILUTED)/UNCORRECTED

FISH SAUCE (FIVE-FOLD DILUTED)/CORRECTED

SOY SAUCE (FIVE-FOLD DILUTED)/UNCORRECTED

SOY SAUCE (FIVE-FOLD DILUTED)/CORRECTED

WINE (FIVE-FOLD DILUTED)/UNCORRECTED

WINE (FIVE-FOLD DILUTED)/CORRECTED

FLUORESCENCE POLARIZATION IMMUNOASSAY METHOD AND FLUORESCENCE POLARIZATION IMMUNOASSAY DEVICE

CROSS-REFERENCE TO RELATED APPLICATIONS

This application claims the benefit of Japanese Patent Application No. 2022-156079, filed on Sep. 29, 2022, the entire disclosure of which is incorporated by reference herein.

FIELD OF THE INVENTION

The present application relates generally to a fluorescence polarization immunoassay method and a fluorescence polarization immunoassay device.

BACKGROUND OF THE INVENTION

One immunoassay that uses antibody-antigen reactions is an assay method called fluorescence polarization immunoassay (FPIA). In FPIA, the concentration of a target substance is estimated by fluorescence polarization measurement. There are competitive and non-competitive FPIA methods. Of these, in competitive FPIA, the target substance and a fluorescently labeled target substance (tracer) are caused to compete with each other to react with the antibody. The tracer that is not bound to the antibody moves vigorously in liquid and fluorescence is emitted randomly when irradiated with polarized excitation light. Meanwhile, the tracer that is bound to the antibody is less likely to move and, as such, emits fluorescence biased in the polarization direction of the excitation light.

In competitive FPIA, each of a fluorescence intensity in a direction parallel to, and a fluorescence intensity in a direction perpendicular to the polarization direction of the excitation light are obtained, and a degree of bias of the fluorescence intensities of both directions is measured as the degree of polarization. Since this degree of polarization is dependent on the amount of tracer-antibody conjugates, it is possible to quantify the concentration of the target substance by setting the degree of polarization as an index.

In FPIA, a calibration curve expressing the relationship between the measured degree of polarization and the concentration of the target substance is created, and the concentration of the target substance included in a sample to be measured is quantified on the basis of the obtained calibration curve (for example, see Unexamined Japanese Patent Application Publication No. 2011-47802 and US Patent Application Publication No. 2009/0023595).

In addition to the tracer, the sample to be measured includes an autofluorescent material. The degree of polarization of the fluorescence is affected by the fluorescence emitted from the autofluorescent material included in the sample to be measured. Due to the influence of the fluorescence from the autofluorescent material, there is an inconvenience in that the intrinsic degree of polarization of the competitive reaction cannot be obtained.

SUMMARY OF THE INVENTION

A fluorescence polarization immunoassay method according to a first aspect is a fluorescence polarization immunoassay method for using an antibody that has binding ability to a target substance and a fluorescently labeled substance, obtained by labeling the target substance with a fluorochrome, to measure a concentration of the target substance included in a first sample to be measured, the method including:

measuring a degree of polarization of a first reference sample that does not include the target substance;

measuring a degree of polarization of each of a plurality of second reference samples that are produced by adding the antibody, the fluorescently labeled substance, and the target substance to the first reference sample, and that have mutually different concentrations of the target substance;

measuring a degree of polarization of the first sample to be measured;

measuring a degree of polarization of a second sample to be measured that is produced by adding the antibody and the fluorescently labeled substance to the first sample to be measured in amounts equal to those added to the second reference samples;

calculating a first corrected degree of polarization by correcting the degree of polarization of the second reference samples with the degree of polarization of the first reference sample, and generating a first calibration curve expressing a relationship between the concentration of the target substance included in the second reference samples and the first corrected degree of polarization;

calculating a second corrected degree of polarization by correcting the degree of polarization of the second sample to be measured with the degree of polarization of the first sample to be measured; and obtaining, as the concentration of the target substance included in the first sample to be measured, a concentration corresponding to the second corrected degree of polarization in the first calibration curve.

A fluorescence polarization immunoassay device according to a second aspect of the present disclosure is a fluorescence polarization immunoassay device that uses an antibody that has binding ability to a target substance and a fluorescently labeled substance, obtained by labeling the target substance with a fluorochrome, to measure a concentration of the target substance included in a first sample to be measured, the device including:

an irradiation optical system that irradiates a sample with linearly polarized excitation light;

a polarization adjustment element that selectively transmits a linearly polarized light component corresponding to a drive signal;

a light receiver that detects fluorescence intensity that passes through the polarization adjustment element; and a controller that outputs the drive signal to the polarization adjustment element and measures, based on the fluorescence intensity detected by the light receiver, a degree of polarization of the sample, wherein the controller measures, with a first reference sample that does not include the target substance as the sample, a degree of polarization of the first reference sample, measures, with a plurality of second reference samples as the sample, a degree of polarization of each of the second reference samples that are produced by adding the antibody, the fluorescently labeled substance, and the target substance to the first reference sample, and that have mutually different concentrations of the target substance, measures, with the first sample to be measured as the sample, a degree of polarization of the first sample to be measured, measures, with a second sample to be measured as the sample, a degree of polarization of the second sample to be measured that is produced by adding the antibody and the fluorescently labeled substance to the first sample to be measured in amounts equal to those added to the second reference samples, calculates a first corrected degree of polarization by correcting the degree of polarization of the second reference samples with the degree of polarization of the first reference sample, and generates a first calibration curve expressing a relationship between the concentration of the target substance included in the second reference samples and the first corrected degree of polarization, calculates a second corrected degree of polarization by correcting the degree of polarization of the second sample to be measured with the degree of polarization of the first sample to be measured, and obtains, as the concentration of the target substance included in the first sample to be measured, a concentration corresponding to the second corrected degree of polarization in the first calibration curve.

It is to be understood that both the foregoing general description and the following detailed description are exemplary and explanatory and are not restrictive of this disclosure.

BRIEF DESCRIPTION OF DRAWINGS

A more complete understanding of this application can be obtained when the following detailed description is considered in conjunction with the following drawings, in which:

FIG. 6 is a schematic drawing illustrating a first example of a drive method of a polarization adjustment element;

DETAILED DESCRIPTION OF THE INVENTION

Figure 1:
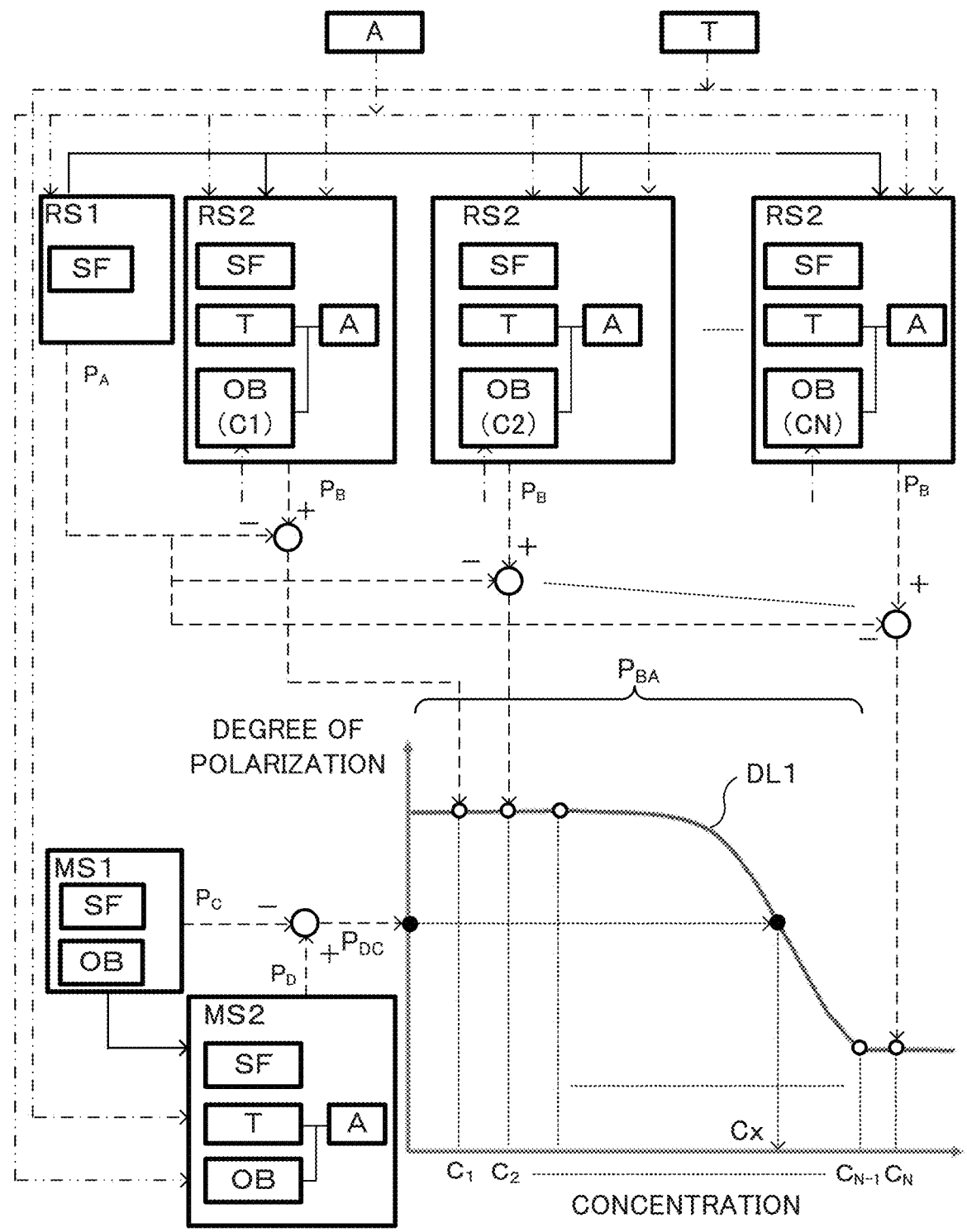
FIG. 1 is a schematic view illustrating a fluorescence polarization immunoassay method according to Embodiment 1 of the present disclosure.

Hereinafter, embodiments of the present embodiment are described in detail while referencing the drawings. Note that, in the drawings, identical or corresponding components are denoted with the same reference numerals.

Embodiment 1

Firstly, Embodiment 1 of the present disclosure is described. A fluorescence polarization immunoassay method according to the present embodiment measures the concentration of a target substance included in a sample to be measured. In the fluorescence polarization immunoassay method schematically illustrated in FIG. 1, the substance that is the target of the measuring is a target substance OB included in a first sample to be measured MS1. This fluorescence polarization immunoassay method measures the concentration of the target substance OB included in the first sample to be measured MS1 using an antibody A that has binding ability to the target substance OB and, as a tracer T, a fluorescently labeled substance obtained by labeling the target substance OB with a fluorochrome. Examples of the fluorochrome include fluorescein, rhodamine, HiLyte Fluor647, and the like.

Samples

In the fluorescence polarization immunoassay method according to the present embodiment, four types of samples are prepared.

(1) First Reference Sample RS1

A first reference sample RS1 is a solution that does not include the target substance OB according to the present embodiment. Typically, a type of solution different from a first sample to be measured MS1 is used. For example, pure water is prepared as the first reference sample RS1. Pure water is also called a water matrix. The first reference sample RS1 may include an autofluorescent material SF.

(2) Second Reference Sample RS2

A second reference sample RS2 is a solution produced by adding an antibody A, a tracer T, and the target substance OB to the first reference sample RS1. A plurality of samples that have mutually different concentrations C1 to CN of the target substance OB is prepared as the second reference sample RS2. Specifically, for the second reference sample RS2, N samples that have mutually different concentrations, namely, a sample having a concentration C1 of the target substance OB, a sample have a concentration C2 of the target substance OB . . . and a sample having a concentration CN of the target substance OB, are prepared.

(3) First Sample to be Measured MS1

The first sample to be measured MS1 is the target of measurement of the fluorescence polarization immunoassay method according to the present embodiment. The first sample to be measured MS1 includes the target substance OB and, in addition, the autofluorescent material SF. This autofluorescent material SF may be the same as that included in the first reference sample RS1, or may be different.

(4) Second Sample to be Measured MS2

A second sample to be measured MS2 is the target of measurement of the fluorescence polarization immunoassay method according to the present embodiment. The second sample to be measured MS2 is produced by adding the antibody A and the tracer T to the first sample to be measured MS1 in amounts equal to those added to the second reference sample RS2.

Fluorescence Polarization Immunoassay Device

Figure 2:
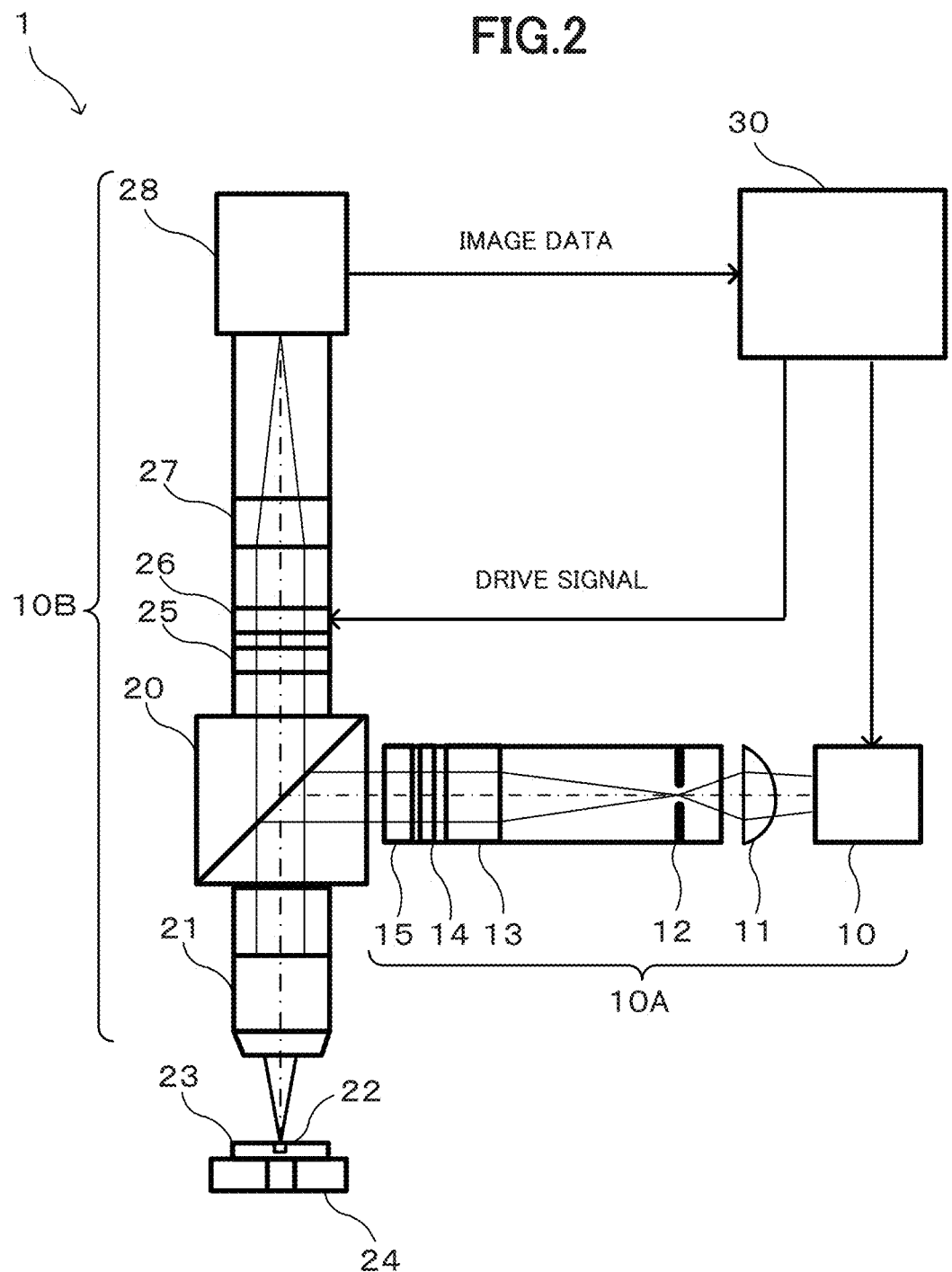
FIG. 2 is a schematic drawing illustrating the configuration of the fluorescence polarization immunoassay device.

The fluorescence polarization immunoassay method is executed by a fluorescence polarization immunoassay device 1 illustrated in FIG. 2. The fluorescence polarization immunoassay device 1 includes a light source 10, a condenser lens 11, an iris 12, a collimator 13, a polarization element 14, an excitation light filter 15, and a dichroic mirror 20. The fluorescence polarization immunoassay device 1 further includes an objective lens 21, a micro device 23 on which a sample 22 is disposed, a stage 24, an absorption filter 25, a polarization adjustment element 26, an image forming lens 27, an imaging element 28, and a controller 30.

In one example, the light source 10 is implemented as a light emitting diode, and emits excitation light of a wavelength that excites the fluorescence of the sample (for example, blue light having a central wavelength of 470 nm). The excitation light from the light source 10 is condensed by the condenser lens 11 and passes through the iris 12. The iris 12 reduces contamination of external light other than the excitation light.

The excitation light that passes through the iris 12 is converted to parallel light by the collimator 13, and enters the polarization element 14. The polarization element 14 is implemented as, for example, a polarizing plate, a polarizing beam splitter, or liquid crystal cell. In this case, the polarization element 14 is implemented as a polarizing plate. The polarization element 14 transmits linearly polarized light of a specific direction. The linearly polarized excitation light from the polarization element 14 passes through the excitation light filter 15. The excitation light filter 15 is a filter for selecting a wavelength range including the wavelength of the excitation light, and reduces light of wavelengths different than the excitation light from the polarization element 14. The dichroic mirror 20 reflects the excitation light that passes through the excitation light filter 15 toward the objective lens 21.

The objective lens 21 condenses the linearly polarized excitation light reflected by the dichroic mirror 20 on the sample 22 housed in the micro device 23 on the stage 24. The sample 22 generates fluorescence of a specific wavelength (for example, green fluorescence) in accordance with the linearly polarized excitation light from the objective lens 21. The fluorescence is converted to parallel light by the objective lens 21, and passes through the dichroic mirror 20 and the absorption filter 25. The dichroic mirror 20 selectively transmits light of a specific wavelength range that includes the fluorescence from the sample 22, and reflects other light. The absorption filter 25 is a filter for selecting the wavelength range that includes the wavelength of the fluorescence from the sample 22, and reduces light other than the fluorescence.

The light that passes through the absorption filter 25 enters the polarization adjustment element 26. In one example, the polarization adjustment element 26 is implemented as a polarizing plate, a polarizing beam splitter, or a liquid crystal cell. The polarization adjustment element 26 may be a polarizing filter in a polarizing camera. A polarizing camera is an imaging device in which a polarizing filter is mounted on a sensor to acquire polarization information of a subject. In the following, an example is described in which the polarization adjustment element 26 is implemented as a liquid crystal cell for which a drive signal (applied voltage) is controlled. The polarization adjustment element 26 can adjust a transmitted light intensity of the linearly polarized light component. Specifically, the polarization adjustment element 26 can adjust the transmitted light intensity of the linearly polarized light parallel to the polarization direction of the excitation light, the linearly polarized light perpendicular to the polarization direction of the excitation light and, also, hereinafter described polarized light of a direction corresponding to the drive signal.

The fluorescence of the linearly polarized light that passes through the polarization adjustment element 26 enters an imaging plane of the imaging element 28 through the image forming lens 27. The surface of the sample 22 and the imaging plane of the imaging element 28 have an image-forming relationship. In one example, the imaging element 28 includes a charge-coupled device (CCD) or a complementary metal-oxide-semiconductor (CMOS) image sensor that includes a plurality of pixels. The imaging element 28 generates image data corresponding to the fluorescence intensity produced by the sample 22, and sends the generated image data to the controller 30.

The fluorescence polarization immunoassay device 1 can be provided with a configuration different from the configuration illustrated in FIG. 2. For example, the fluorescence polarization immunoassay device 1 may be configured so as to cause the excitation light from the light source 10 to diagonally enter the sample 22, and separate an optical axis of an optical system that emits the excitation light and an optical axis of an optical system for observing fluorescence, thereby rendering the dichroic mirror 20 unnecessary. Additionally, the iris 12, the excitation light filter 15, and the absorption filter 25 may be omitted when unnecessary. The fluorescence polarization immunoassay device 1 can include other lenses in addition to or instead of the condenser lens 11, the objective lens 21, and the image forming lens 27 illustrated in FIG. 2.

The controller 30 centrally controls the entire fluorescence polarization immunoassay device 1. Specifically, the controller 30 controls the light source 10, the polarization adjustment element 26, and the imaging element 28. The controller 30 acquires a fluorescence image captured by the imaging element 28.

For example, during a measurement operation, the controller 30 causes the excitation light from the light source 10 to be emitted on the sample 22. The controller 30 uses a DA converter (not illustrated) to output a drive signal to the polarization adjustment element 26. By outputting the drive signal to the polarization adjustment element 26, the controller 30 can control the polarized component of the fluorescence that passes through the polarization adjustment element 26.

In one example, the polarization adjustment element 26 includes two opposing transparent substrates, a transparent electrode disposed on the opposing surfaces of the substrates, a liquid crystal material sealed between the substrates, and a polarizing plate disposed on an outer side surface on an imaging device side (exit side or downstream side) of the polarization adjustment element 26. Provided that the polarization adjustment element 26 can adjust the polarized component of the fluorescence passing through, any configuration may be used.

The fluorescence polarization immunoassay device 1 controls the drive signal to the polarization adjustment element (the liquid cell) 26 and, also, an exposure time (imaging time) of the imaging element 28, that is, a start time and period of the imaging, to acquire desired image data about the polarized component of the fluorescence. The fluorescence polarization immunoassay device 1 performs an analysis of the acquired image data. As described later, the fluorescence polarization immunoassay device 1 captures, by the imaging element 28, fluorescence images of the sample 22, namely fluorescence images of the first reference sample RS1, the second reference samples RS2, the first sample to be measured MS1, and the second sample to be measured MS2, and measures the concentration of the target substance OB included in the first sample to be measured MS1 on the basis of the image data of that fluorescence image. As a result, it is possible to reduce measurement error, caused by the autofluorescent material SF included in the first sample to be measured MS1, of the concentration of the target substance OB.

Figure 3:
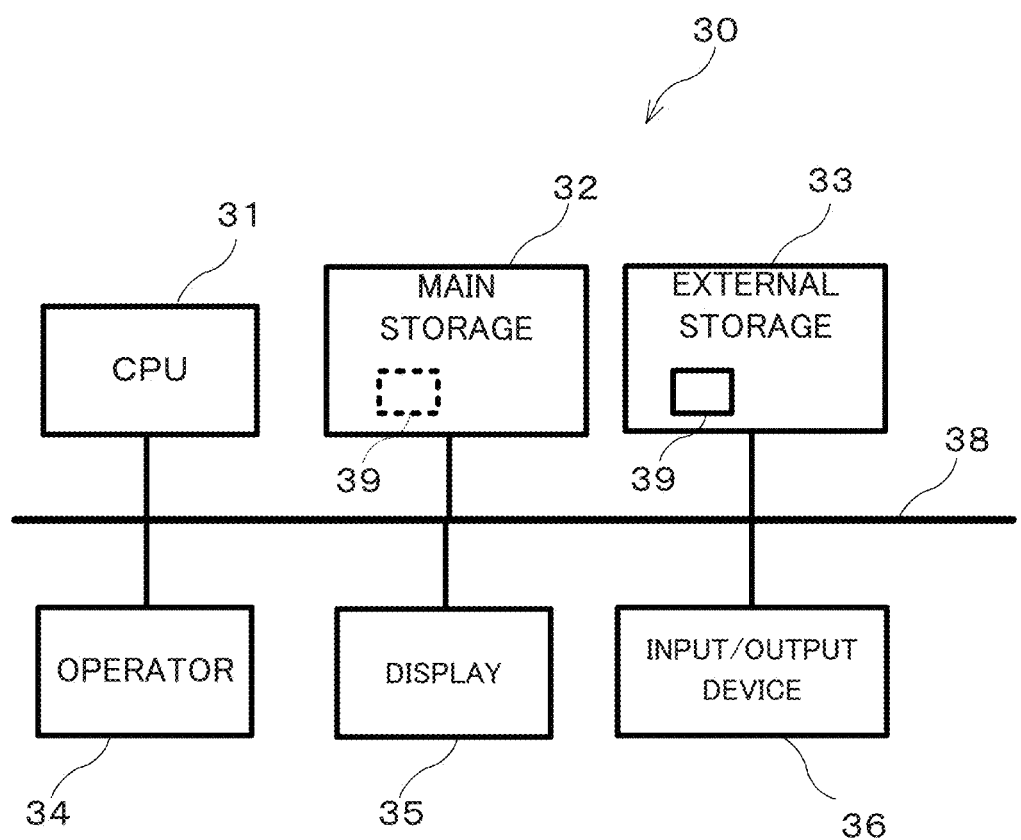
FIG. 3 is a block diagram illustrating the hardware configuration of a controller.

In one example, the controller 30 of the fluorescence polarization immunoassay device 1 illustrated in FIG. 2 is realized by a computer, provided with the hardware configuration illustrated in FIG. 3, executing a software program. Specifically, the fluorescence polarization immunoassay device 1 includes a central processing unit (CPU) 31 that controls the entire device, a main storage 32 that operates as a working area of the CPU 31, an external storage 33 that stores an operation program of the CPU 31, an operator 34, a display 35, an input/output device 36, and an internal bus 38 that connects these components to each other.

The main storage 32 is configured from random access memory (RAM). A program 39 to be executed by the CPU 31 is loaded from the external storage 33 into the main storage 32. The main storage 32 is also used as the working area (temporary storage area for data) of the CPU 31.

The external storage 33 is configured from nonvolatile memory such as a flash memory or a hard disk. The program 39 to be executed by the CPU 31 is stored in advance in the external storage 33.

The operator 34 is configured from devices such as a keyboard and a mouse, and an interface device that connects these devices to the internal bus 38.

The display 35 is configured from a display device such as a cathode ray tube (CRT) or a liquid crystal monitor.

The input/output device 36 is an interface for sending/receiving data to/from an external device. In accordance with commands from the CPU 31, the input/output device 36 outputs the drive signal to the polarization adjustment element 26 and, also, inputs the image data from the imaging element 28. The inputted image data is stored in the main storage 32 or the external storage 33, and is displayed on the display 35.

The functions of the controller 30 can be implemented in a computer system configured from one or more computers including one or more processors and one or more storage devices that includes a non-transitory recording medium. A plurality of computers can realize the functions of the controller 30 while communicating across a communication network to which each of the plurality of computers is connected. For example, a portion of the plurality of functions of the controller 30 may be implemented on one computer, and another portion may be implemented on another computer.

The constituents of the fluorescence polarization immunoassay device 1 described above are summarized as follows:

(A) An irradiation optical system 10A that irradiates the sample 22 with linearly polarized excitation light, the irradiation optical system 10A including the light source 10, the condenser lens 11, the iris 12, the collimator 13, the polarization element 14, and the excitation light filter 15;

(B) The micro device 23 that houses the sample 22, and the stage 24 on which the micro device 23 is placed;

(C) An observation optical system 10B including the polarization adjustment element 26 that adjusts the linearly polarized light component, of the fluorescence emitted from the sample 22, that transmits in accordance with the drive signal from the controller 30, and the imaging element 28 that captures the fluorescence image that transmits through the polarization adjustment element 26; and (D) The controller 30 that functions as a driver for outputting the drive signal to the polarization adjustment element 26 and, also analyzes the sample by detecting the fluorescence intensity on the basis of the fluorescence image captured by the imaging element 28, and measuring the degree of polarization of the sample 22 in accordance with the drive signal.

In the fluorescence polarization immunoassay method according to the present embodiment the following measurements are carried out using the fluorescence polarization immunoassay device 1 having the configuration described above.

(1) A degree of polarization $P_A$ of the first reference sample RS1, when the first reference sample RS1 is the sample 22;

(2) A degree of polarization $P_B$ of each of the plurality of second reference samples RS2 that have different concentrations C1 to CN of the target substance OB, when the plurality of second reference samples RS2 is the sample 22;

(3) A degree of polarization $P_C$ of the first sample to be measured MS1, when the first sample to be measured MS1 is the sample 22; and (4) A degree of polarization $P_D$ of the second sample to be measured MS2, when the second sample to be measured MS2 is the sample 22.

Figure 4:
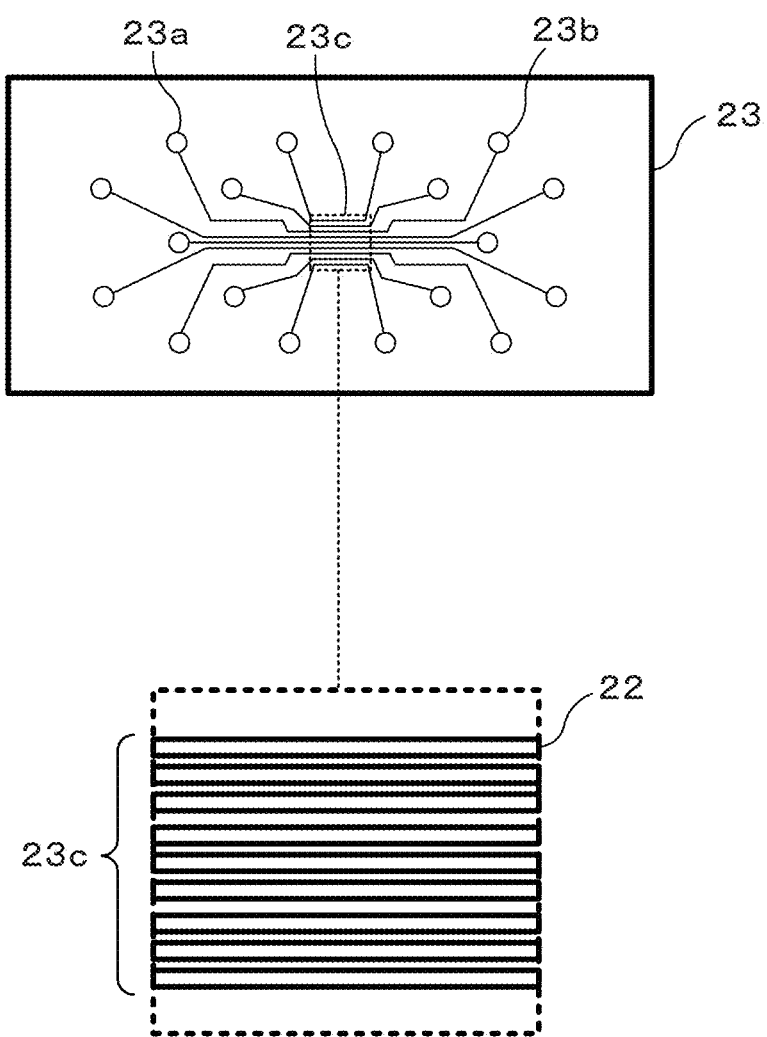
FIG. 4 is a schematic drawing of a micro device.

As illustrated in FIG. 4, the micro device 23 includes a plurality of channels 23c, each of which includes a first end connected to an injection port 23a and a second end connected to a discharge port 23b. It is possible to individually supply, to the plurality of channels 23c and as the sample 22, the first reference sample RS1, the plurality of second reference samples RS2, the first sample to be measured MS1, or the second sample to be measured MS2. Since the channels 23c and the imaging plane of the imaging element 28 have an image-forming relationship, when imaging the plurality of channels 23c by the imaging element 28, it is possible to obtain fluorescence images of the plurality of samples 22 supplied to the plurality of channels 23c at once, and it is possible to measure the degrees of polarization $P_A$, $P_B$, $P_C$, and $P_D$ of the various samples 22 at once. This measurement is performed on the basis of the fluorescence intensity of a region of interest (ROI), in the fluorescence image, of the image data corresponding to the channels 23c.

Figure 5A:
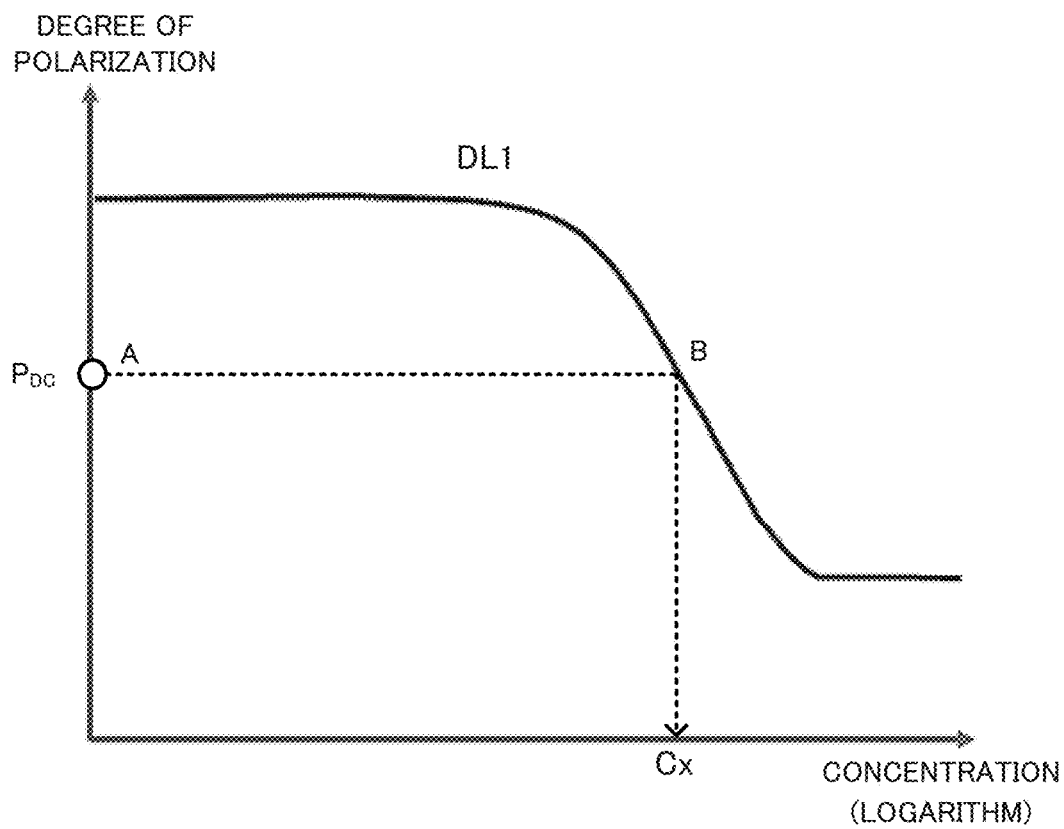
FIG. 5A is a first schematic drawing illustrating the principle for detecting the concentration of a target substance using a first calibration curve.

The controller 30 corrects the degree of polarization $P_B$ of the plurality of second reference samples RS2 with the degree of polarization $P_A$ of the first reference sample RS1 to calculate a first corrected degree of polarization $P_{BA}$, and generates a first calibration curve DL1 (see FIG. 5A) that expresses the relationship between the concentrations C1 to CN of the target substance OB included in the first reference sample RS1 and the first corrected degree of polarization $P_{BA}$. Note that, in the graph of FIG. 5A, the concentration (logarithm) is illustrated on the horizontal axis and the degree of polarization is illustrated on the vertical axis. Additionally, the controller 30 corrects the degree of polarization $P_D$ of the second sample to be measured MS2 with the degree of polarization $P_C$ of the first sample to be measured MS1 to calculate a second corrected degree of polarization $P_{DC}$. Furthermore, as illustrated in FIG. 5A, in the first calibration curve DL1, the controller 30 obtains a concentration Cx corresponding to the second corrected degree of polarization $P_{DC}$ as the concentration of the target substance OB included in the first sample to be measured MS1.

Figure 5B:
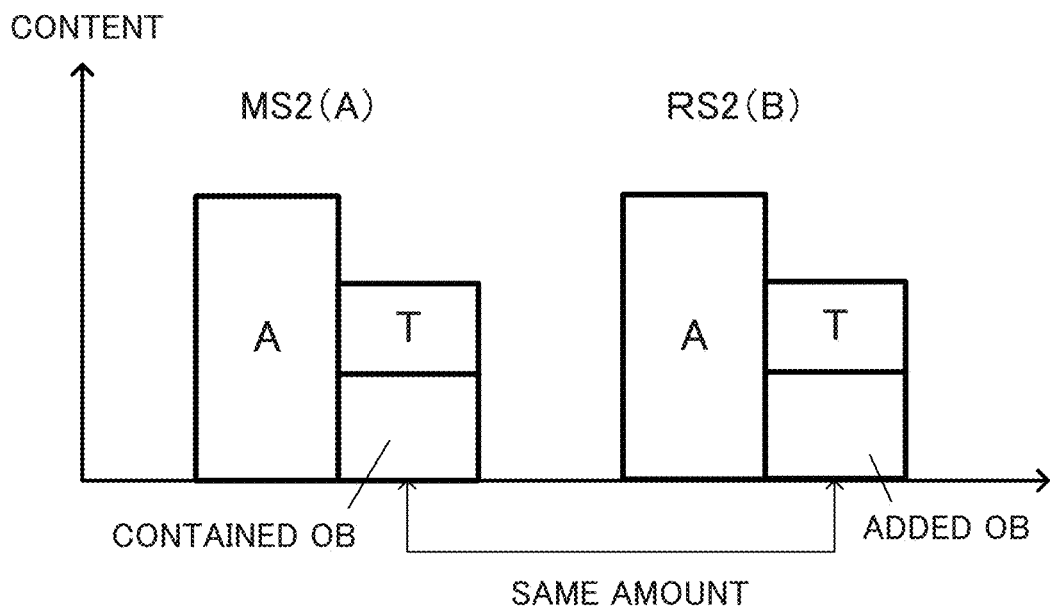
FIG. 5B is a second schematic drawing illustrating the principle for detecting the concentration of the target substance using the first calibration curve.

The calculated second corrected degree of polarization $P_{DC}$ is obtained by correcting the degree of polarization $P_D$ of the second sample to be measured MS2 with the degree of polarization $P_C$ of the first sample to be measured MS1. Since the amount of the tracer T is fixed, the second corrected degree of polarization $P_{DC}$ is determined by the amount of the target substance OB included in the first sample to be measured MS1. Meanwhile, the first calibration curve DL1 is determined by the first corrected degree of polarization $P_{BA}$ obtained by correcting the degree of polarization $P_B$ of the plurality of second reference samples RS2 with the degree of polarization $P_A$ of the first reference sample RS1, and the first corrected degree of polarization $P_{BA}$ is determined by the amount of target substance OB added to the plurality of second reference samples RS2. As illustrated in FIG. 5A, the second corrected degree of polarization $P_{DC}$ at a point A and the first corrected degree of polarization $P_{BA}$ at a point B being the same value means that the amount of the contained target substance OB at the point A and the amount of added target substance OB at the point B are the same, as illustrated in FIG. 5B. Accordingly, by obtaining the second corrected degree of polarization $P_{DC}$ and obtaining the concentration of the target substance OB at the point B corresponding to that second corrected degree of polarization $P_{DC}$, the obtained concentration will correspond to the concentration of the contained target substance OB included in the first sample to be measured MS1.

As illustrated in FIG. 6, the controller 30 applies, as the drive signal, a rectangular pulse wave that periodically oscillates between specific positive and negative voltage values to set the polarization adjustment element 26 to the ON state. This rectangular pulse wave is a first signal 40. The polarization adjustment element 26 assumes the ON state at either a positive or negative voltage value of the first signal 40. A detection period K1 is defined in a period (first period) T1 in which the polarization adjustment element 26 is in the ON state.

In the detection period K1, the controller 30 causes the imaging element 28 to receive the fluorescence and capture the fluorescence image. When the polarization adjustment element 26 is in the ON state, a polarized component, of the fluorescence from the sample 22, perpendicular to the polarization direction of the excitation light is received. A fluorescence intensity $I_\perp$ thereof is expressed as a total amount of received light in the ROI corresponding to the channels 23c of the fluorescence image in the detection period K1, or as a time average thereof.

The controller 30 inputs a drive signal having a voltage level of 0 to the polarization adjustment element 26 in order to set the polarization adjustment element 26 to the OFF state. This drive signal is a second signal 41. The second signal 41 has a different signal level than the first signal 40. Due to this drive signal, the polarization adjustment element 26 assumes the OFF state. A detection period K2 is defined in a second period T2 in which the polarization adjustment element 26 is in the OFF state. In the detection period K2, the controller 30 causes the imaging element 28 to receive the fluorescence from the sample 22 and capture the fluorescence image. When the polarization adjustment element 26 is in the OFF state, a polarized component, of the fluorescence from the sample 22, parallel to the polarization direction of the excitation light is received. A fluorescence intensity $I_{//}$ thereof is expressed as an amount of received light in the ROI corresponding to the channels 23c of the fluorescence image in the detection period K2, or as a time average thereof.

That is, in the present embodiment, the controller 30 inputs, into the polarization adjustment element 26, drive signals in which the first signal 40 and the second signal 41 repeat in an alternating manner. Here, the first signal 40 is for allowing transmittance of only the linearly polarized light having a polarization direction that is orthogonal to the excitation light incident on the sample 22, and the second signal 41 is for allowing transmittance of only the linearly polarized light having a polarization direction parallel to the excitation light incident on the sample 22. The fluorescence intensity detected by the imaging element 28 in the first period T1 during which the first signal 40 is input is defined as a first fluorescence intensity, and the fluorescence intensity detected by the imaging element 28 in the second period T2 during which the second signal 41 is input is defined as a second fluorescence intensity.

When the sample 22 is the first reference sample RS1, the controller 30 measures, as the degree of polarization $P_A$ of the first reference sample RS1, a fluorescence intensity $A(I_\perp)$ detected by the imaging element 28 in the first period T1, and a fluorescence intensity $A(I_{//})$ detected by the imaging element 28 in the second period T2. Furthermore, when the sample 22 is the plurality of second reference samples RS2, the controller 30 measures, as the degree of polarization $P_B$ of the plurality of second reference samples RS2, a fluorescence intensity $B(I_\perp)$ detected by the imaging element 28 in the first period T1, and a fluorescence intensity $B(I_{//})$ detected by the imaging element 28 in the second period T2. Furthermore, the first corrected degree of polarization $P_{BA}$ is obtained by calculating the following equation:

Equation 1

$$P_{BA} = \frac{(B(I_{//}) - A(I_{//})) - (B(I_\perp) - A(I_\perp))}{(B(I_{//}) - A(I_{//})) + (B(I_\perp) - A(I_\perp))} \tag{1}$$

When the sample 22 is the first sample to be measured MS1, the controller 30 measures, as the degree of polarization $P_C$ of the first sample to be measured MS1, a fluorescence intensity $C(I_\perp)$ detected by the imaging element 28 in the first period T1, and a fluorescence intensity $C(I_{//})$ detected by the imaging element 28 in the second period T2. Furthermore, when the sample 22 is the second sample to be measured MS2, the controller 30 measures, as the degree of polarization $P_D$ of the second sample to be measured MS2, a fluorescence intensity $D(I_\perp)$ detected by the imaging element 28 in the first period T1, and a fluorescence intensity $D(I_{//})$ detected by the imaging element 28 in the second period T2. Furthermore, controller 30 obtains the second corrected degree of polarization $P_{DC}$ by calculating the following equation:

Equation 2

$$P_{DC} = \frac{(D(I_{//}) - C(I_{//})) - (D(I_\perp) - C(I_\perp))}{(D(I_{//}) - C(I_{//})) + (D(I_\perp) - C(I_\perp))} \quad (2)$$

Next, measurement processing executed by the controller 30 of the fluorescence polarization immunoassay device 1, that is, a fluorescence polarization immunoassay method is described. The measurement processing starts upon completion of the setting of the micro device 23.

Figure 7:
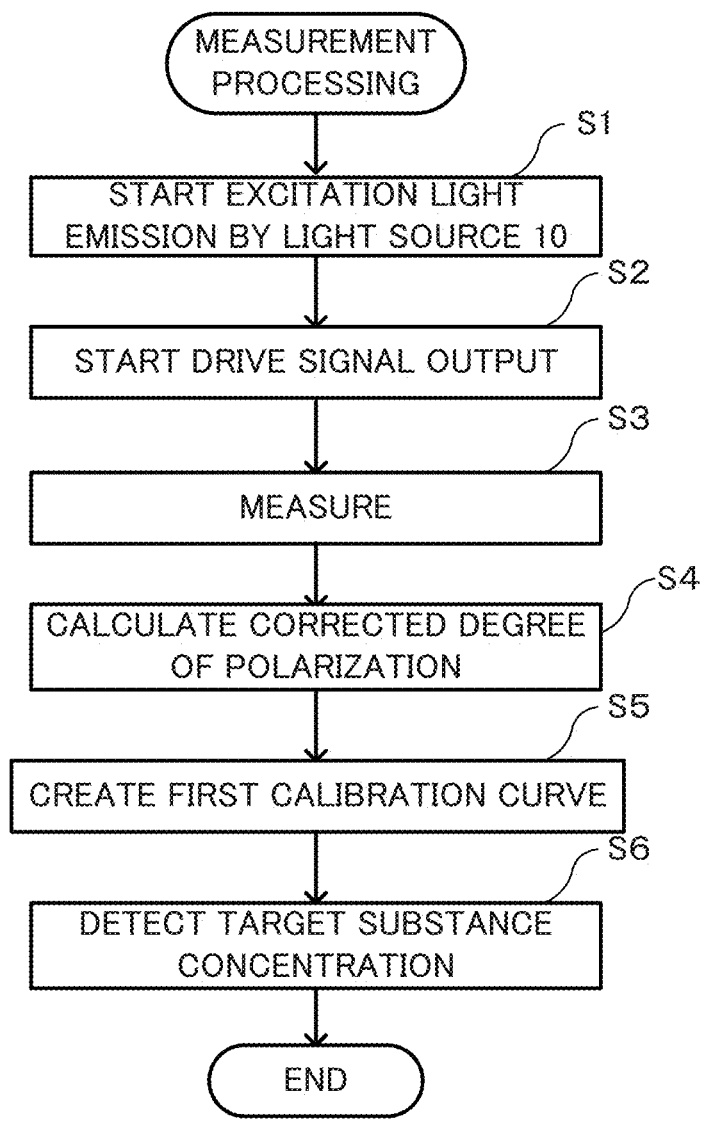
FIG. 7 is a flowchart illustrating measurement processing of the controller.

As illustrated in FIG. 7, firstly, the controller 30 causes the light source 10 to start emitting the excitation light (step S1). Then, the controller 30 starts the outputting of the drive signal to the polarization adjustment element 26 (step S2).

Next, the controller 30 performs measurement of the fluorescence intensity (step S3). In this measurement, the controller 30, synchronized with the drive signal and on the basis of the image data captured by the imaging element 28 in the first period T1 (the detection period K1), measures the fluorescence intensity $A(I_\perp)$ corresponding to the first reference sample RS1, the fluorescence intensity $B(I_\perp)$ corresponding to the plurality of second reference samples RS2, the fluorescence intensity $C(I_\perp)$ corresponding to the first sample to be measured MS1, and the fluorescence intensity $D(I_\perp)$ corresponding to the second sample to be measured MS2. Furthermore, the controller 30 measures, on the basis of the image data captured by the imaging element 28 in the second period T2 (the detection period K2), the fluorescence intensity $A(I_{//})$ corresponding to the first reference sample RS1, the fluorescence intensity $B(I_{//})$ corresponding to the plurality of second reference samples RS2, the fluorescence intensity $C(I_{//})$ corresponding to the first sample to be measured MS1, and the fluorescence intensity $D(I_{//})$ corresponding to the second sample to be measured MS2.

Furthermore, the controller 30 calculates Equations (1) and (2) above, to calculate the second corrected degree of polarization $P_{DC}$ and the first corrected degree of polarization $P_{BA}$ (step S4). Next, the controller 30 creates the first calibration curve DL1 on the basis of the calculated first corrected degree of polarization $P_{BA}$ (step S5). Then, the controller 30 obtains, in the first calibration curve DL1, the concentration Cx corresponding to the second corrected degree of polarization $P_{DC}$ as the concentration of the target substance OB included in the first sample to be measured MS1 (step S6). After the end of step S6, the controller 30 ends the measurement processing.

Note that, in the present embodiment, the polarization adjustment element 26 is controlled by drive signals that repeatedly turn the polarization adjustment element 26 ON/OFF, but the present embodiment is not limited thereto. A configuration is possible in which the controller 30 inputs, into the polarization adjustment element 26 and as the drive signal, a signal for changing a first transmitted light intensity of the linearly polarized light perpendicular to the polarization direction of the excitation light and a second transmitted light intensity of the linearly polarized light parallel to the polarization direction of the excitation light to a sine wave form. In such a case, as, for example, illustrated in FIG. 8, the drive signal changes over time so as to reverse between a positive value and a negative value at a high frequency. A positive envelope and a negative envelope of the drive signal are line-symmetric with respect to the horizontal axis (time axis). The envelopes change periodically in a period longer than the reversal period.

Figure 8:
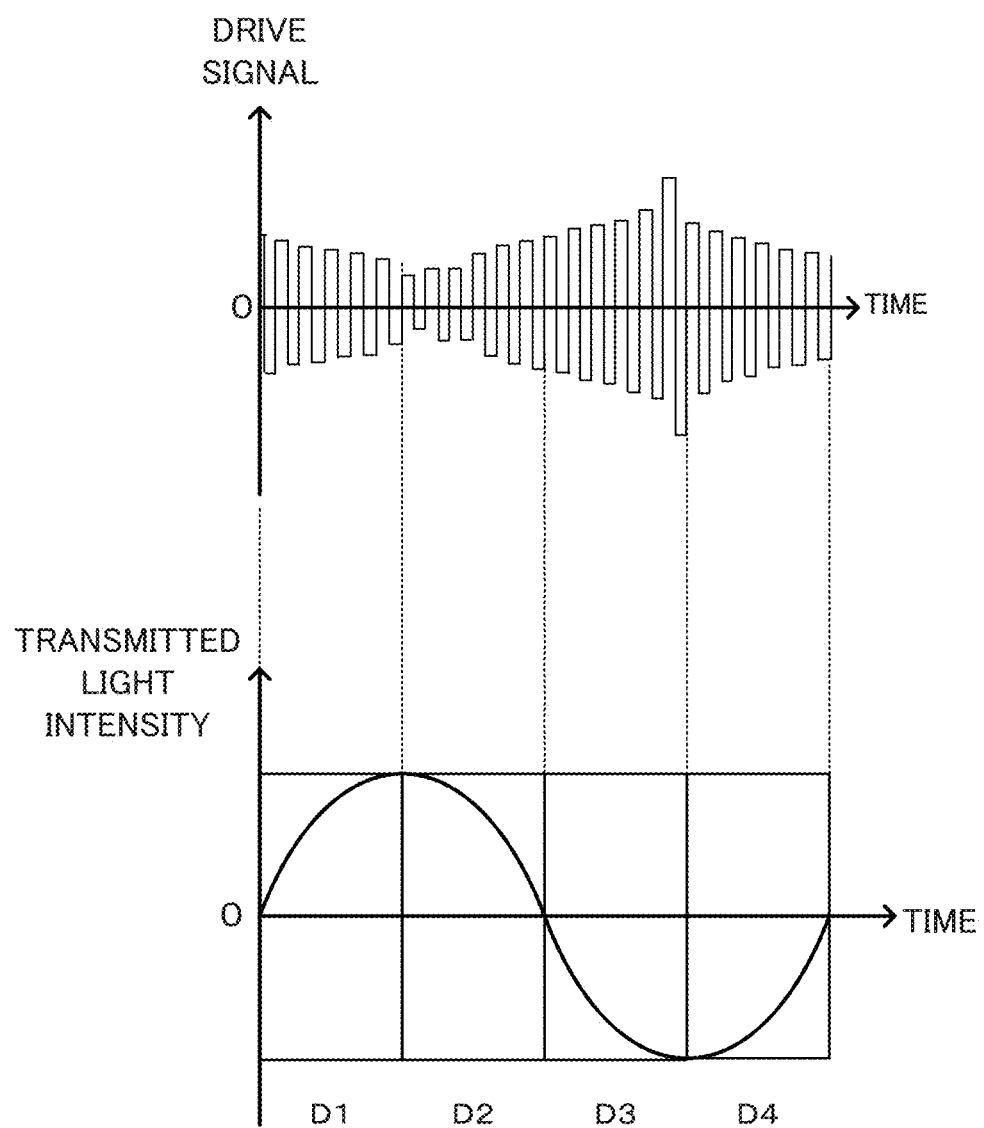
FIG. 8 is a schematic drawing illustrating a second example of the drive method of the polarization adjustment element.

When such a drive signal is inputted into the polarization adjustment element 26, the first transmitted light intensity changes to a form similar to a sine wave, as illustrated in FIG. 8. Note that the change of the second transmitted light intensity is in reverse phase with the change of the first transmitted light intensity. The first transmitted light intensity and the second transmitted light intensity decrease as the absolute value of the drive signal increases, and increase as the absolute value of the drive signal decreases. Note that, provided that the changes of the first transmitted light intensity and the second transmitted light intensity can exhibit a change similar to a sine wave, the waveform of the voltage applied to the polarization adjustment element 26 is not particularly limited.

For example, the controller 30 calculates, in various periods, the fluorescence intensity of the ROI in an image of a fluorescence sample. Here, the various periods are a first period D1, a second period D2, a third period D3, and a fourth period D4. The fluorescence intensity in each period is an integrated value of an amount of time of the fluorescence intensity of the ROI in each period, and is the total amount of received light of the pixels on the ROI in each period (exposure period). The controller 30 evaluates the fluorescence polarization of the sample on the basis of the light intensity in each of the first period D1 to the fourth period D4. In each of the first period D1 to the fourth period D4, the imaging element 28 receives light of a specific polarized component of the fluorescence. The polarized component in each period has a range of polarization directions.

Specifically, the controller 30 inputs, into the polarization adjustment element 26 and as the drive signal, a signal for changing the first transmitted light intensity of the linearly polarized light perpendicular to the polarization direction of the excitation light and the second transmitted light intensity of the linearly polarized light parallel to the polarization direction of the excitation light to a sine wave form. The polarization adjustment element 26 changes the first transmitted light intensity and the second transmitted light intensity to a sine wave form and to reverse phases.

One period of the transmitted light intensity changed to a sine wave form is divided evenly into four periods, and these periods are defined as the first period D1, the second period D2, the third period D3, and the fourth period D4. When the sample 22 is the first reference sample RS1, the controller 30 measures, as the degree of polarization PA of the first reference sample RS1, average values $p_{1A}$, $p_{2A}$, $p_{3A}$, and $p_{4A}$ of the fluorescence intensity detected by the imaging element 28 in the first period D1, the second period D2, the third period D3, and the fourth period D4. When the sample 22 is the plurality of second reference samples RS2, the controller 30 measures, as the degree of polarization $P_B$ of the plurality of second reference samples RS2, average values $p_{1B}$, $p_{2B}$, $p_{3B}$, and $p_{4B}$ of the fluorescence intensity detected by the imaging element 28 in the first period D1, the second period D2, the third period D3, and the fourth period D4. Moreover, the controller 30 calculates $p_{xBA} = p_{xB} - p_{xA}$ (where x=1, 2, 3, 4) and, furthermore, obtains the first corrected degree of polarization $P_{BA}$ by calculating the following equation:

Equation 3

$$P_{BA} = \frac{\sqrt{(p_{1BA} - p_{3BA})^2 + (p_{2BA} - p_{4BA})^2}}{\frac{p_{1BA} + p_{2BA} + p_{3BA} + p_{4BA}}{4}} \quad (3)$$

When the sample 22 is the first sample to be measured MS1, the controller 30 measures, as the degree of polarization $P_C$ of the first sample to be measured MS1, average values $p_{1C}$, $p_{2C}$, $p_{3C}$, and $p_{4C}$ of the fluorescence intensity detected by the imaging element 28 in the first period D1, the second period D2, the third period D3, and the fourth period D4. When the sample 22 is the second sample to be measured MS2, the controller 30 measures, as the degree of polarization $P_D$ of the second sample to be measured MS2, average values $p_{1D}$, $p_{2D}$, $p_{3D}$, and $p_{4D}$ of the fluorescence intensity detected by the imaging element 28 in the first period D1, the second period D2, the third period D3, and the fourth period D4.

Moreover, the controller 30 calculates $p_{xDC}=p_{xD}-p_{xC}$ (where x=1, 2, 3, 4). Furthermore, the controller 30 obtains the second corrected degree of polarization $P_{DC}$ by calculating the following equation:

Equation 4

$$P_{DC} = \frac{\sqrt{(p_{1DC} - p_{3DC})^2 + (p_{2DC} - p_{4DC})^2}}{\frac{p_{1DC} + p_{2DC} + p_{3DC} + p_{4DC}}{4}} \quad (4)$$

Embodiment 2

Figure 9:
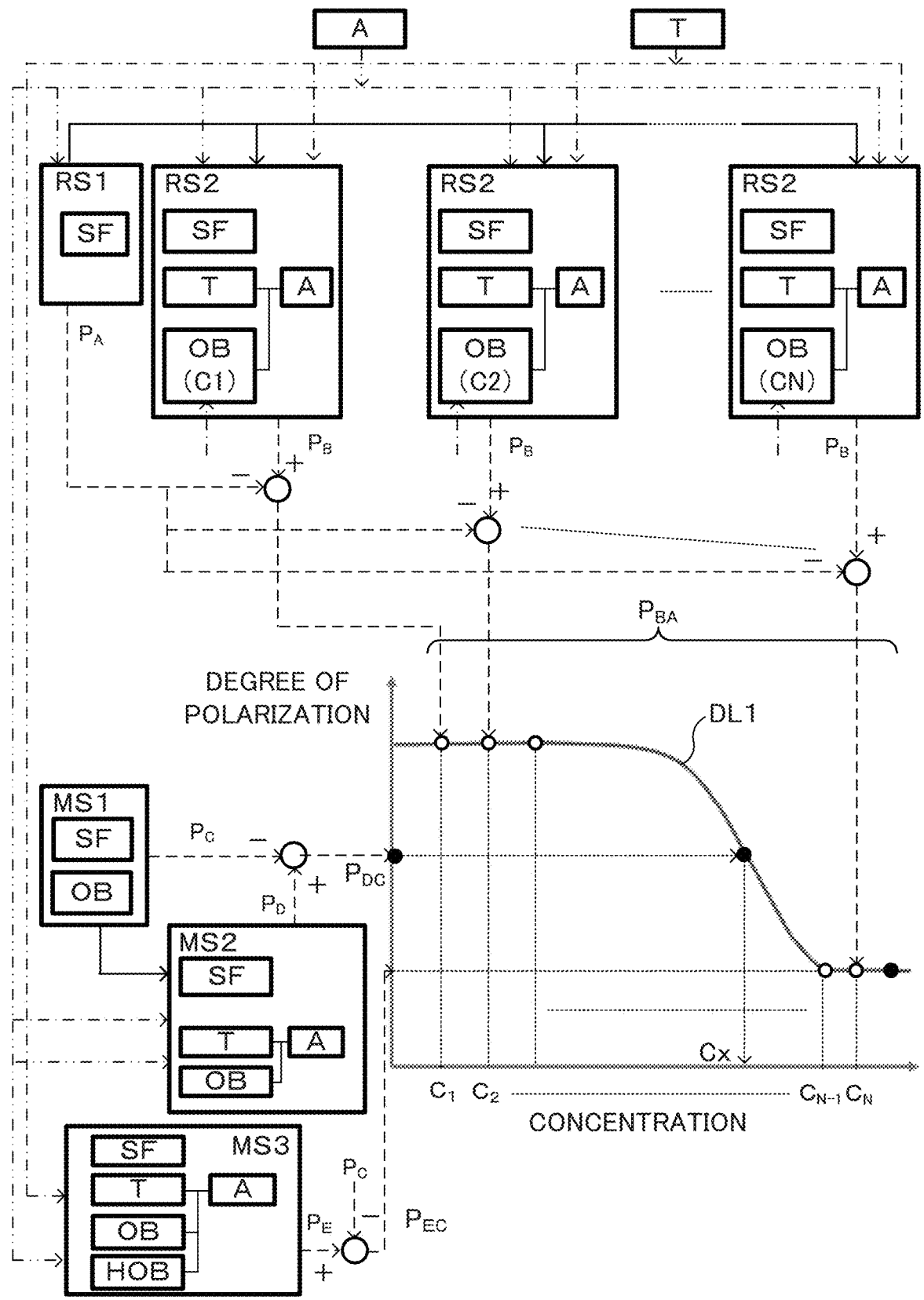
FIG. 9 is a schematic drawing illustrating a fluorescence polarization immunoassay method according to the Embodiment 2 of the present disclosure.

Next, Embodiment 2 of the present disclosure is described. In the fluorescence polarization immunoassay method according to Embodiment 1, the concentration of the target substance OB included in the first sample to be measured MS1 is measured using, as the sample 22, the first reference sample RS1, the plurality of second reference samples RS2, the first sample to be measured MS1, and the second sample to be measured MS2. As illustrated in FIG. 9, in the present embodiment, a third sample to be measured MS3 is further prepared.

The third sample to be measured MS3 is produced by adding the antibody A, the tracer T, and a high-concentration target substance HOB to the first sample to be measured MS1 in amounts equal to those added to the plurality of second reference samples RS2. The concentration of the high-concentration target substance HOB is a concentration where the degree of polarization is smallest in the first calibration curve DL. The third sample to be measured MS3 is housed in the micro device 23 in the same manner as the other samples 22. The controller 30 measures a degree of polarization $P_E$ of the third sample to be measured MS3 housed in the micro device 23.

As illustrated in FIG. 9, the controller 30 calculates a third corrected degree of polarization $P_{EA}$ by correcting the degree of polarization $P_E$ of the third sample to be measured MS3 with the degree of polarization $P_A$ of the first sample to be measured MS1. The controller 30 displays the first calibration curve DL1 and the third corrected degree of polarization $P_{EA}$ on the display 35 (see FIG. 3) in a comparable manner.

Due to this display, it is possible to confirm whether a difference between a level of the minimum value of the first calibration curve DL and the third corrected degree of polarization $P_{EA}$ is within a tolerance value. As a result, it can be confirmed, from the measurement results, that the influence of the autofluorescent material SF in the first sample to be measured MS1 has been canceled.

Note that a configuration is possible in which the controller 30 shifts the first calibration curve DL1 in the vertical axis direction so that the level of the minimum value of the first calibration curve DL1 and the third corrected degree of polarization $P_{EA}$ match.

Embodiment 3

Figure 10:
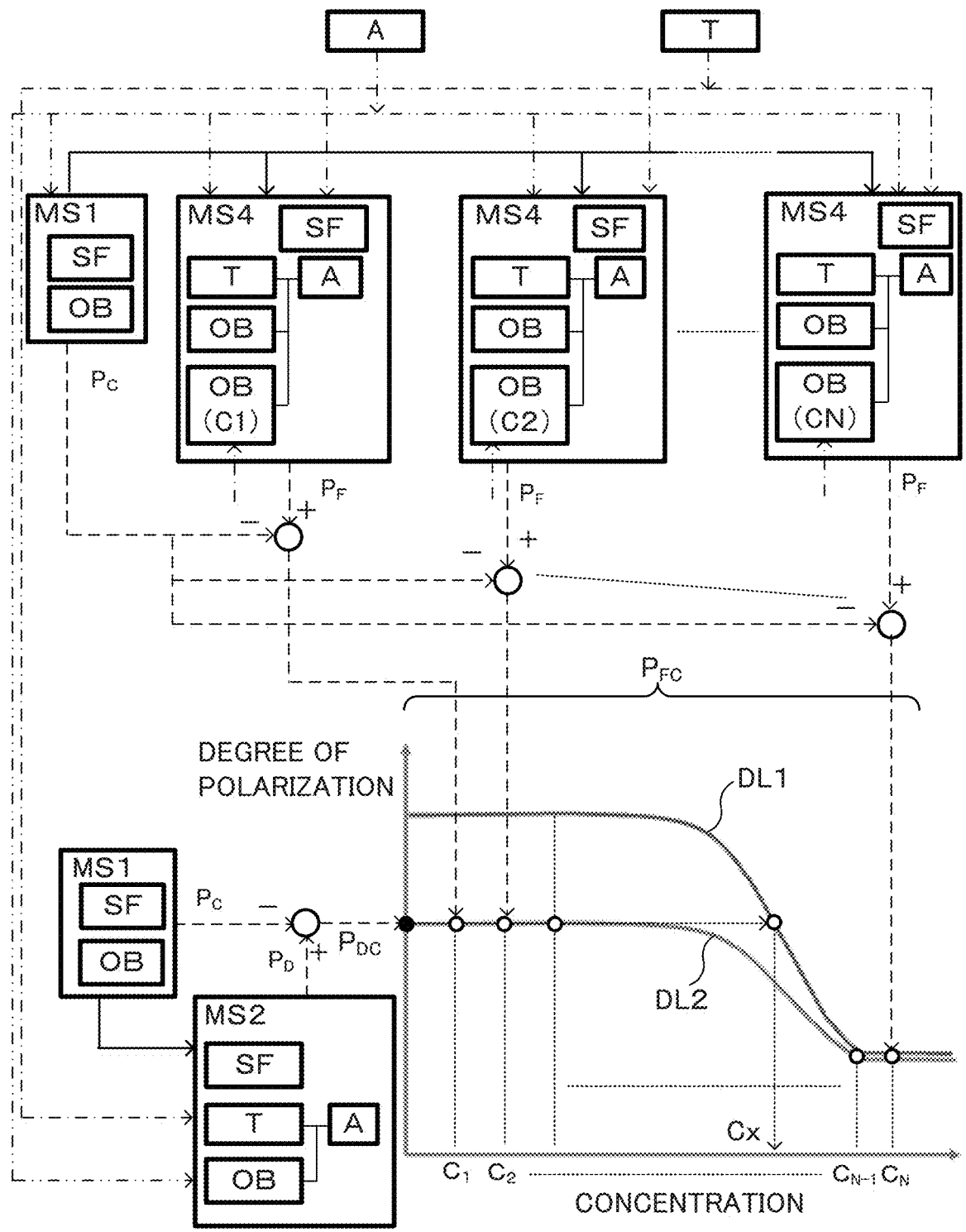
FIG. 10 is a schematic drawing illustrating a fluorescence polarization immunoassay method according to the Embodiment 3 of the present disclosure.

Next, Embodiment 3 of the present disclosure is described. In the fluorescence polarization immunoassay method according to Embodiment 1, the concentration of the target substance OB included in the first sample to be measured MS1 is measured using, as the sample 22, the first reference sample RS1, the plurality of second reference samples RS2, the first sample to be measured MS1, and the second sample to be measured MS2. In the present embodiment, as illustrated in FIG. 10, in addition to the sample 22, a plurality of fourth samples to be measured MS4 is prepared. The plurality of fourth samples to be measured MS4 is produced by adding the antibody A, the tracer T, and a target substance to the first sample to be measured MS1, and the plurality of fourth samples to be measured MS4 have mutually different concentrations of the target substance OB.

The fluorescence polarization immunoassay device 1 measures a degree of polarization $P_F$ of each of the plurality of fourth samples to be measured MS4 that have mutually different concentrations of the target substance OB. The controller 30 calculates a fourth corrected degree of polarization $P_{FC}$ by correcting the degree of polarization $P_F$ of the plurality of fourth samples to be measured MS4 with the degree of polarization $P_C$ of the first sample to be measured MS1, and the controller 30 generates a second calibration curve DL2 that expresses the relationship between the concentration of the target substance OB included in the plurality of fourth samples to be measured MS4 and the fourth corrected degree of polarization $P_{FC}$. In the plurality of second samples to be measured MS2, a change in the degree of polarization corresponding to the added target substance OB can be confirmed from the second calibration curve DL2.

The controller 30 comparatively displays the first calibration curve DL1 and the second calibration curve DL2 on the display 35 (see FIG. 3). It can be confirmed that the error caused by the autofluorescent material SF decreases depending on whether the difference between the curves in the high-concentration region is in a tolerance range.

Note that a configuration is possible in which the controller 30 shifts the first calibration curve DL1 in the vertical axis direction so that the level of the minimum value of the first calibration curve DL1 and the level of the minimum value of the second calibration curve DL2 match.

Note that a configuration is possible in which the controller 30 measures both the third sample to be measured MS3 and the plurality of fourth samples to be measured MS4, confirms that the error caused by the autofluorescent material SF has been decreased, and compares the first calibration curve DL1, the second calibration curve DL2, and the third corrected degree of polarization $P_{EA}$ to correct the first calibration curve DL1.

EXAMPLES

With fish sauce and soy sauce as the objects to be measured (first sample to be measured) and histamine concentration included therein as the target substance OB, measurement of the concentration of the histamine was performed. The measurement procedure was as follows.

Measurement of First Reference Sample

A: Pure water was used for the first reference sample RS1. The first reference sample RS1 was introduced into the nine channels 23c of the micro device 23, and the degree of polarization of each was measured.

Measurement of Second Reference Samples

B: The antibody A, the tracer T, and the target substance OB were added to pure water to produce nine second reference samples having mutually different concentrations of the target substance OB (aqueous solutions of nine concentration levels), and the concentration of each was measured.
1) As the tracer T, histamine, which is the target substance OB, was modified with HiLyte Fluor 647. This was dissolved in pure water and a 4.56 nM solution was prepared using phosphate buffered saline (PBS(−)).
2) An antihistamine antibody was diluted using PBS(−) containing 0.01% bovine serum albumin (BSA), and a $1.3 \times 10^{-7}$M solution was prepared.
3) Histamine, which is the target substance OB, was dissolved in pure water, and a 32 mg/ml solution was prepared.
4) The concentration of the obtained histamine solution was adjusted using pure water to the nine levels illustrated in the following table.

TABLE 1

| | HISTAMINE CONCENTRATION (M) | HISTAMINE CONCENTRATION (µg/mL) |
|---|---|---|
| 1 | 0.287899 | 32000 |
| 2 | 0.02879 | 3200 |
| 3 | 0.002879 | 320 |
| 4 | 0.000288 | 32 |
| 5 | $2.88 \times 10^{-5}$ | 3.2 |
| 6 | $2.88 \times 10^{-6}$ | 0.32 |
| 7 | $2.88 \times 10^{-7}$ | 0.032 |
| 8 | $2.88 \times 10^{-8}$ | 0.0032 |
| 9 | $2.88 \times 10^{-9}$ | 0.00032 |

5) An acylating reagent and an acylation buffer were mixed with each of the nine levels of histamine solution as in the following table.

TABLE 2

| HISTAMINE AQUEOUS SOLUTION (µl) | ACYLATING REAGENT (µl) | ACYLATION BUFFER (µl) |
|---|---|---|
| 100 | 25 | 200 |

6) 25 µL of each of the mixed solutions, 25 µL of the histamine tracer of 1), and 25 µL of the antibody solution of 2) were mixed and left in a light-shielded area for ten minutes at room temperature. Then, the degree of polarization of each of the mixed solutions was measured.

Measurement of First Sample to be Measured

C: Only the first sample to be measured MS1 was introduced into the nine channels 23c of the micro device 23, and measurement was performed. Soy sauce, fish sauce, and wine were used as three types of objects to be measured. Each was diluted 5-fold with the PBS(−) and then introduced into the nine channels 23c of the micro device 23. Then, the degree of polarization of each was measured.

Measurement of Second and Fourth Samples to be Measured

D. Nine concentration levels of the target substance OB were respectively added to the first sample to be measured MS1 to produce the second samples to be measured MS2 and the fourth samples to be measured MS4, and the degree of polarization of each was measured.
1) Histamine was modified with HiLyte Fluor 647 to produce the tracer T. This was dissolved in pure water, and a 4.56 nM solution was prepared using PBS(−).
2) An antihistamine antibody was diluted using PBS(−) containing 0.01% BSA, and a $1.3 \times 10^{-7}$M solution was prepared.
3) Histamine was dissolved in pure water, and a 32 mg/mL solution was prepared.
4) The concentration of the obtained histamine solution was adjusted using pure water to the nine different concentration levels illustrated in the following table.

TABLE 3

| | HISTAMINE CONCENTRATION (M) | HISTAMINE CONCENTRATION (µg/mL) |
|---|---|---|
| 1 | 0.287899 | 32000 |
| 2 | 0.02879 | 3200 |
| 3 | 0.002879 | 320 |
| 4 | 0.000288 | 32 |
| 5 | $2.88 \times 10^{-5}$ | 3.2 |
| 6 | $2.88 \times 10^{-6}$ | 0.32 |
| 7 | $2.88 \times 10^{-7}$ | 0.032 |
| 8 | $2.88 \times 10^{-8}$ | 0.0032 |
| 9 | $2.88 \times 10^{-9}$ | 0.00032 |

5) The sample was added to the nine concentration levels of the histamine solution as in the following table so that the sample was five-fold diluted in each solution.

TABLE 4

| HISTAMINE SOLUTION (µl) | SAMPLE (µl) | PBS(—)(µl) | TOTAL (µl) |
|---|---|---|---|
| 100 | 40 | 60 | 200 |

TABLE 5

| | HISTAMINE CONCENTRATION (M) | HISTAMINE CONCENTRATION (µg/mL) |
|---|---|---|
| 1 | 0.14395 | 16000 |
| 2 | 0.014395 | 1600 |
| 3 | 0.001439 | 160 |
| 4 | 0.000144 | 16 |
| 5 | $1.44 \times 10^{-5}$ | 1.6 |
| 6 | $1.44 \times 10^{-6}$ | 0.16 |
| 7 | $1.44 \times 10^{-7}$ | 0.016 |
| 8 | $1.44 \times 10^{-8}$ | 0.0016 |
| 9 | $1.44 \times 10^{-9}$ | 0.00016 |

6) An acylating reagent and an acylation buffer were mixed, as in the following table, with each of the sample solutions to which the nine different concentration levels of histamine were added.

TABLE 6

| SAMPLE-ADDED HISTAMINE SOLUTION (µl) | ACYLATING REAGENT (µl) | ACYLATION BUFFER (µl) |
|---|---|---|
| 100 | 25 | 200 |

7) 25 µL of each of the mixed solutions, 25 µL of the histamine tracer solution of 1), and 25 µL of the antibody solution of 2) were mixed and left in a light-shielded area for ten minutes at room temperature. Then, the degree of fluorescence polarization of each the mixed solutions was measured.

Figure 11A:
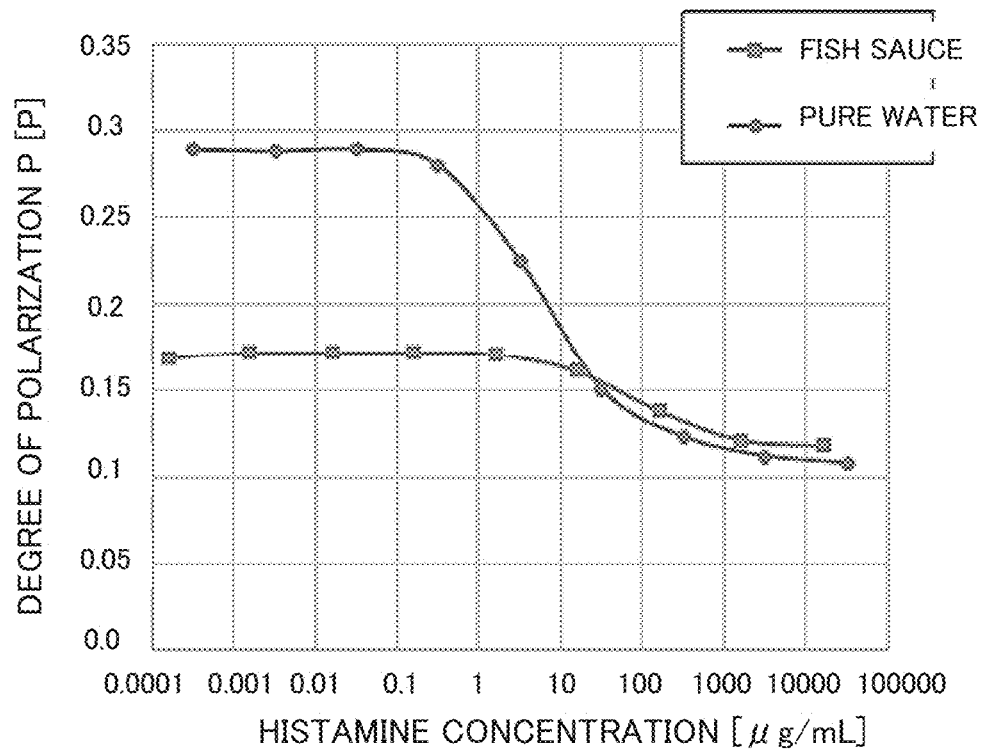
FIG. 11A is a drawing illustrating an uncorrected calibration curve of histamine included in fish sauce and pure water.
Figure 11B:
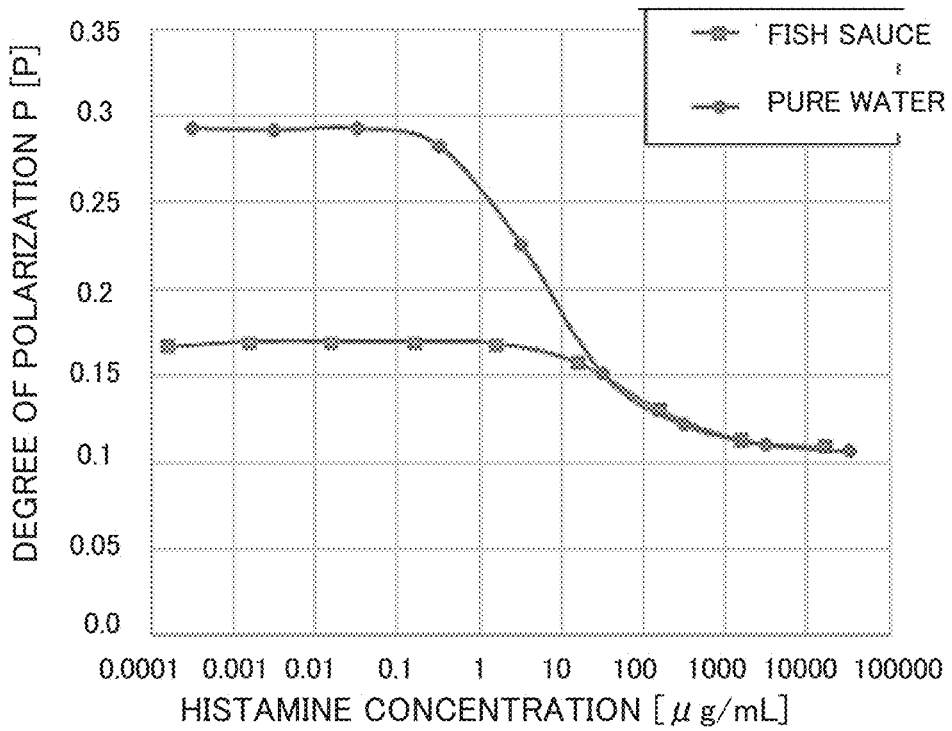
FIG. 11B is a drawing illustrating a corrected calibration curve of histamine included in fish sauce and pure water.

The results of measuring the concentration of the target substance OB, with fish sauce as the object to be measured and histamine included therein as the target substance OB, are illustrated in FIGS. 11A and 11B. As illustrated in FIG. 11A, in a case in which a solution in which the fish sauce was five-fold diluted is the first sample to be measured MS1, pure water is the first reference sample RS1, and the first calibration curve DL1 and the second calibration curve DL2 are generated without correcting, an offset occurs in the high-concentration region. However, as illustrated in FIG. 11B, in the first calibration curve DL1 and the second calibration curve DL2 generated while correcting using the fluorescence polarization immunoassay method according to the present embodiment, the offset between the two curves in the high-concentration region is smaller. This demonstrates that the influence of the autofluorescent material SF in the first calibration curve DL1 and the second calibration curve DL2 has been canceled by the correction.

Figure 12A:
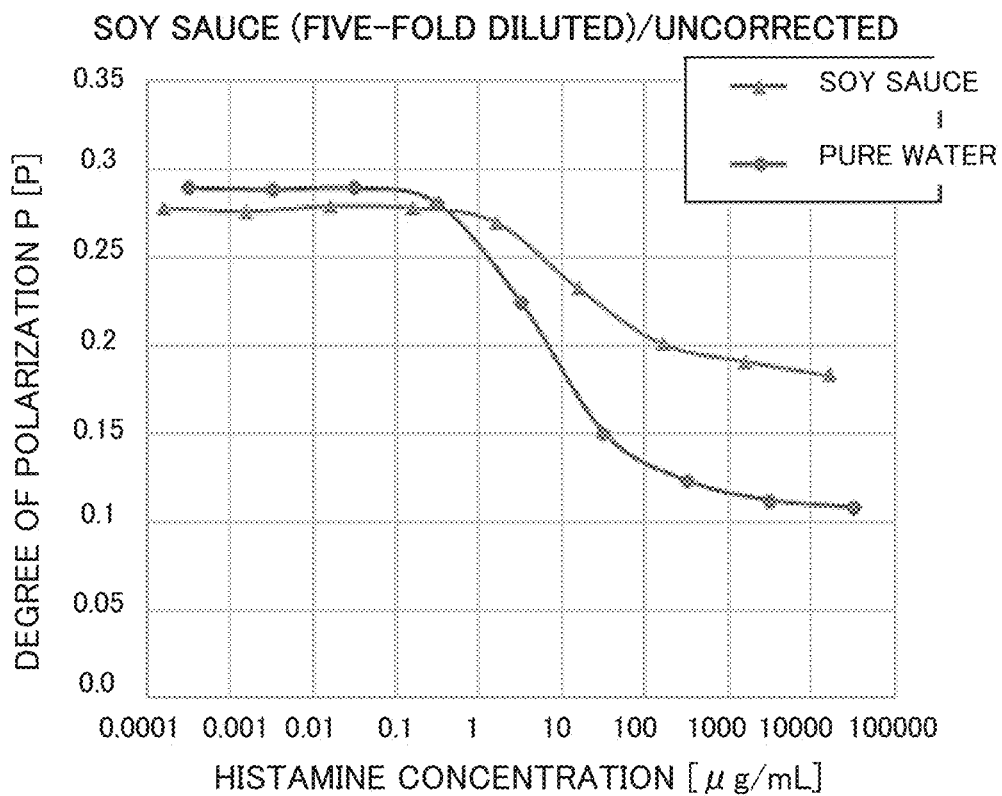
FIG. 12A is a drawing illustrating an uncorrected calibration curve of histamine included in soy sauce and pure water.
Figure 12B:
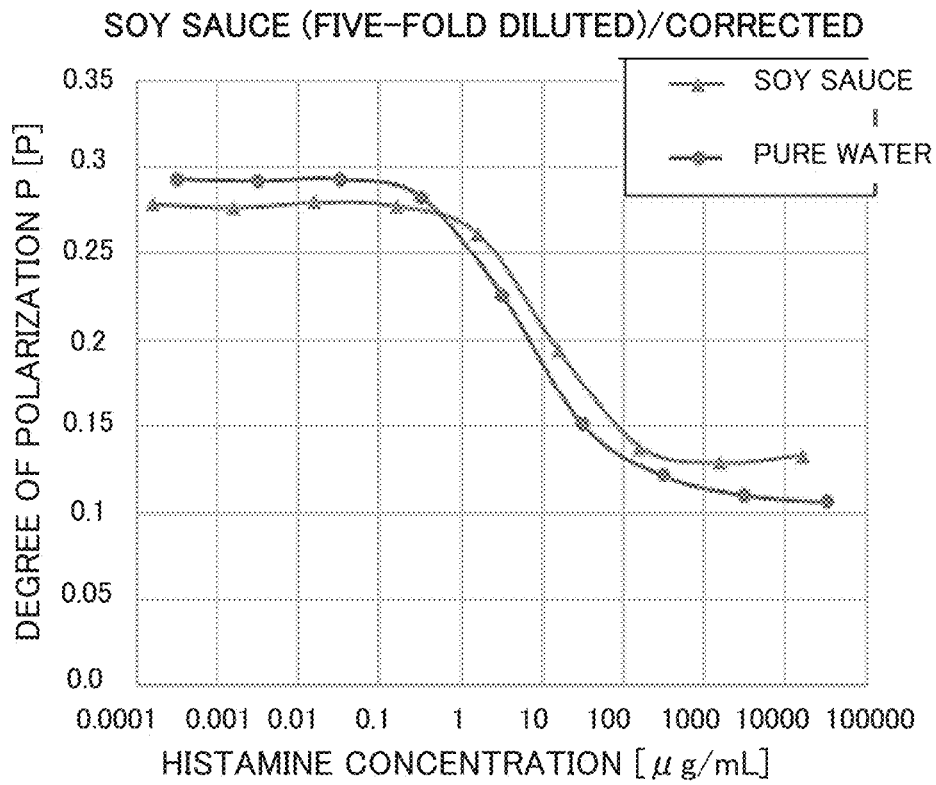
FIG. 12B is a drawing illustrating a corrected calibration curve of histamine included in soy sauce and pure water.

The results of measuring the concentration of the target substance OB, with soy sauce as the object to be measured and histamine included therein as the target substance OB, are illustrated in FIGS. 12A and 12B. As illustrated in FIG. 12A, in a case in which a solution in which the soy sauce was five-fold diluted is the first sample to be measured MS1, pure water is the first reference sample RS1, and the first calibration curve DL1 and the second calibration curve DL2 are generated without correcting, an offset occurs in the high-concentration region. However, as illustrated in FIG. 12B, in the first calibration curve DL1 and the second calibration curve DL2 generated while correcting using the fluorescence polarization immunoassay method according to the present embodiment, the offset between the two curves in the high-concentration region is smaller. This demonstrates that the influence of the autofluorescent material SF in the first calibration curve DL1 and the second calibration curve DL2 has been canceled by the correction.

Figure 13A:
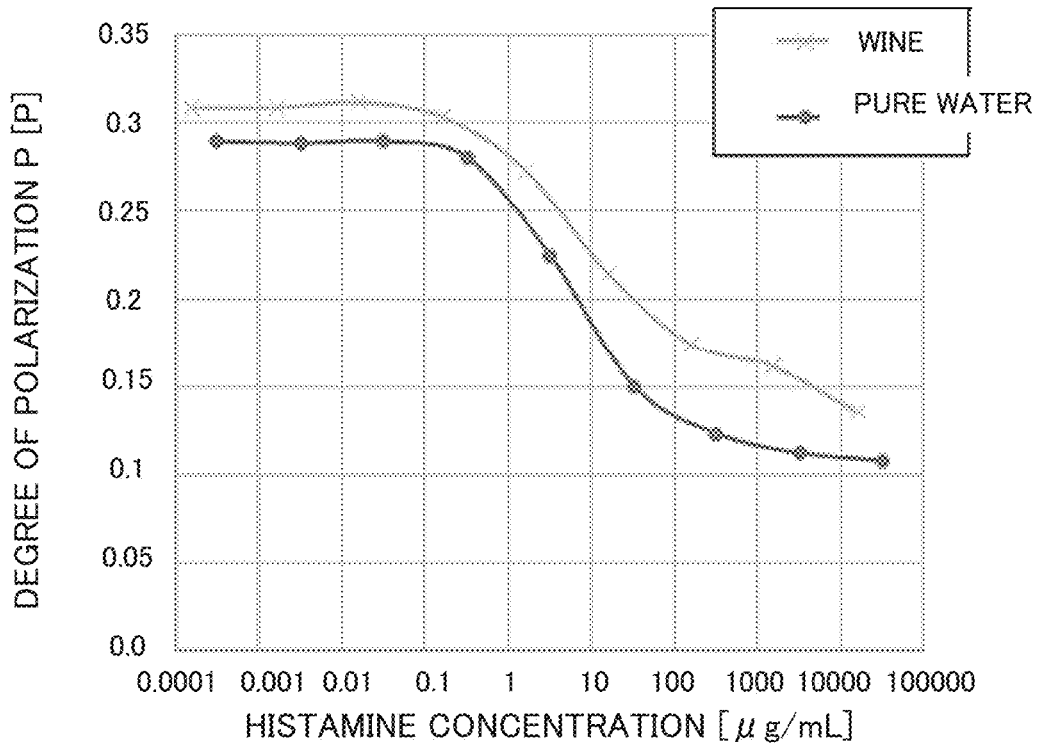
FIG. 13A is a drawing illustrating an uncorrected calibration curve of histamine included in wine and pure water.
Figure 13B:
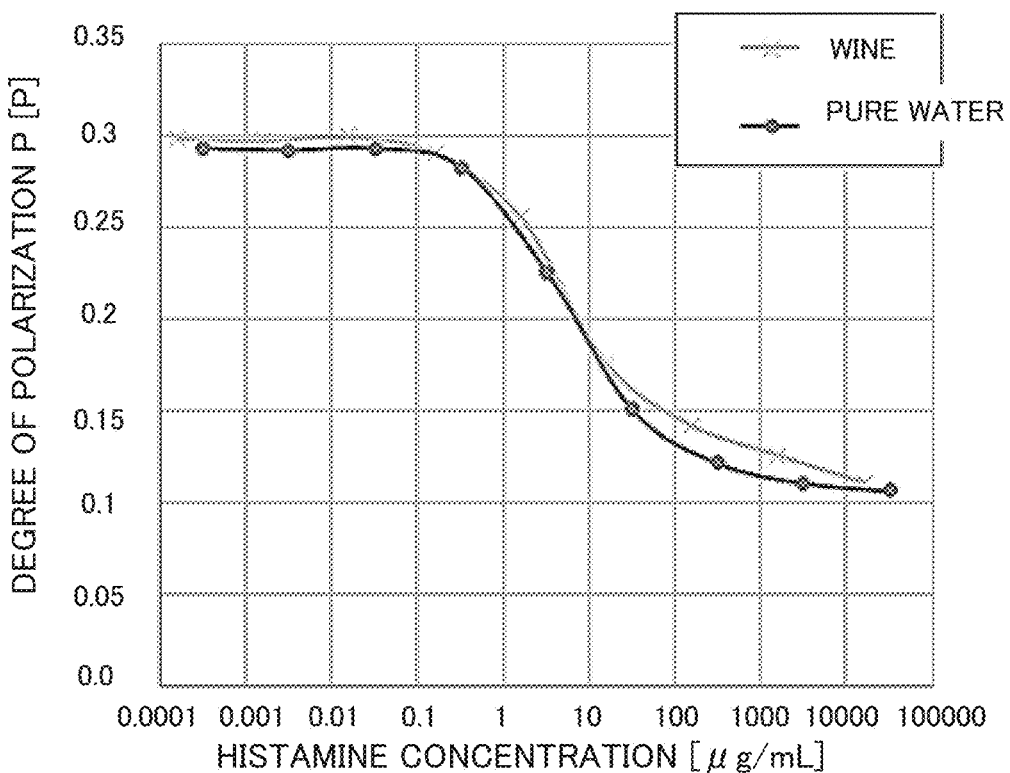
FIG. 13B is a drawing illustrating a corrected calibration curve of histamine included in wine and pure water.

The results of measuring the concentration of the target substance OB, with wine as the object to be measured and histamine included therein as the target substance OB, are illustrated in FIGS. 13A and 13B. As illustrated in FIG. 13A, in a case in which a solution in which the wine was five-fold diluted is the first sample to be measured MS1, pure water is the first reference sample RS1, and the first calibration curve DL1 and the second calibration curve DL2 are generated without correcting, an offset occurs in the high-concentration region. However, as illustrated in FIG. 13B, in the first calibration curve DL1 and the second calibration curve DL2 generated while correcting using the fluorescence polarization immunoassay method according to the present embodiment, the offset between the two curves in the high-concentration region is smaller. This demonstrates that the influence of the autofluorescent material SF in the first calibration curve DL1 and the second calibration curve DL2 has been canceled by the correction. As illustrated in FIG. 13B, in the wine, the second calibration curve DL2 and the first calibration curve DL1 are within the tolerance range throughout all regions.

As the plurality of second reference samples RS2 for the calibration curve, it is sufficient that the concentration of the target substance OB is known and there are a plurality of samples that have different concentration levels. Additionally, in the examples described above, pure water is used as the first reference sample RS1, but a buffer such as phosphate buffered saline (PBS), or another solvent may be used. Any substance that can dissolve the target substance OB and that does not inhibit the antigen-antibody reaction can be selected. For example, it is difficult to use organic solvents, solvents with extremely high or low pH, and the like that denature antibodies (proteins).

In the embodiment described above, the light receiver is implemented as the imaging element 28, but the present disclosure is not limited thereto. A configuration is possible in which, when individually detecting the degree of polarization of each of the samples 22, namely the first reference sample RS1, the plurality of second reference samples RS2, the first sample to be measured MS1, the second sample to be measured MS2, and the like, the light receiver is a component such as a photodiode that detects only fluorescence intensity.

The object to the measured and the target substance are not limited to those described above. Fundamentally, any substances that can compete in an antigen-antibody reaction, or an object to be measured containing such a substance can be used.

The hardware configuration and the software configuration of the controller 30 are examples, and can be changed and modified as desired.

The central portion that performs processing of the controller 30 that includes the CPU 31, the main storage 32, the external storage 33, the operator 34, the display 35, the input/output device 36, and the internal bus 38 is not limited to a dedicated system, and can be realized using a typical computer system. For example, the controller 30 that executes the processing described above may be implemented by storing and distributing a computer program for executing the operations described above on a non-transitory computer-readable recording medium (a flexible disk, a CD-ROM, a DVD-ROM, or the like), and installing that computer program on a computer. Additionally, the controller 30 may be implemented by storing the computer program on a storage device or a server device provided on a communication network such as the internet, and downloading that computer program by a typical computer system.

In cases in which the functions of the controller 30 are realized by being divided between an operating system (OS) and an application/program, or are realized by cooperation between an OS and an application/program, it is possible to store only the application/program portion on the non-transitory recording medium or in the storage device.

The computer programs can be piggybacked on carrier waves and distributed via a communication network. For example, the computer program may be posted to a bulletin board system (BBS) on a communication network, and distributed via the network. Moreover, a configuration is possible in which the processings described are executed by starting this computer program and, under the control of the operating system (OS), executing the computer program in the same manner as other applications/programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A fluorescence polarization immunoassay method for using an antibody that has binding ability to a target substance and a fluorescently labeled substance, obtained by labeling the target substance with a fluorochrome, to measure a concentration of the target substance included in a first sample to be measured, the method comprising:
   measuring a degree of polarization of a first reference sample that does not include the target substance;
   measuring a degree of polarization of each of a plurality of second reference samples that are produced by adding the antibody, the fluorescently labeled substance, and the target substance to the first reference sample, and that have mutually different concentrations of the target substance;
   measuring a degree of polarization of the first sample to be measured;
   measuring a degree of polarization of a second sample to be measured that is produced by adding the antibody and the fluorescently labeled substance to the first sample to be measured in amounts equal to those added to the second reference samples;
   calculating a first corrected degree of polarization by correcting the degree of polarization of the second reference samples with the degree of polarization of the first reference sample, and generating a first calibration curve expressing a relationship between the concentration of the target substance included in the second reference samples and the first corrected degree of polarization;
   calculating a second corrected degree of polarization by correcting the degree of polarization of the second sample to be measured with the degree of polarization of the first sample to be measured; and
   obtaining, as the concentration of the target substance included in the first sample to be measured, a concentration corresponding to the second corrected degree of polarization in the first calibration curve.

2. The fluorescence polarization immunoassay method according to claim 1, further comprising:
   measuring a degree of polarization of a third sample to be measured that is generated by adding the antibody, the fluorescently labeled substance, and the target substance to the first sample to be measured, and in which a concentration of the target substance is a concentration at which the degree of polarization is smallest in the first calibration curve; and
   calculating a third corrected degree of polarization by correcting the degree of polarization of the third sample to be measured with the degree of polarization of the first sample to be measured.

3. The fluorescence polarization immunoassay method according to claim 1, further comprising:
   measuring a degree of polarization of each of a plurality of fourth samples to be measured that are produced by adding the antibody, the fluorescently labeled substance, and the target substance to the first sample to be measured, and that have mutually different concentrations of the target substance; and
   calculating a fourth corrected degree of polarization by correcting the degree of polarization of the fourth samples to be measured with the degree of polarization of the first sample to be measured, and generating a second calibration curve expressing a relationship between the concentration of the target substance included in the fourth samples to be measured and the fourth corrected degree of polarization.

4. A fluorescence polarization immunoassay device that uses an antibody that has binding ability to a target substance and a fluorescently labeled substance, obtained by labeling the target substance with a fluorochrome, to measure a concentration of the target substance included in a first sample to be measured, the device comprising:
   an irradiation optical system that irradiates a sample with linearly polarized excitation light;
   a polarization adjustment element that selectively transmits a linearly polarized light component corresponding to a drive signal;
   a light receiver that detects fluorescence intensity that passes through the polarization adjustment element; and
   a controller that outputs the drive signal to the polarization adjustment element and measures, based on the fluorescence intensity detected by the light receiver, a degree of polarization of the sample in accordance with the drive signal,
   wherein
   the controller
      measures, with a first reference sample that does not include the target substance as the sample, a degree of polarization of the first reference sample,
      measures, with a plurality of second reference samples as the sample, a degree of polarization of each of the second reference samples that are produced by adding the antibody, the fluorescently labeled substance, and the target substance to the first reference sample, and that have mutually different concentrations of the target substance,
      measures, with the first sample to be measured as the sample, a degree of polarization of the first sample to be measured,
      measures, with a second sample to be measured as the sample, a degree of polarization of the second sample to be measured that is produced by adding the antibody and the fluorescently labeled substance to the first sample to be measured in amounts equal to those added to the second reference samples, calculates a first corrected degree of polarization by correcting the degree of polarization of the second reference samples with the degree of polarization of the first reference sample, and generates a first calibration curve expressing a relationship between the concentration of the target substance included in the second reference samples and the first corrected degree of polarization, calculates a second corrected degree of polarization by correcting the degree of polarization of the second sample to be measured with the degree of polarization of the first sample to be measured, and obtains, as the concentration of the target substance included in the first sample to be measured, a concentration corresponding to the second corrected degree of polarization in the first calibration curve.

5. The fluorescence polarization immunoassay device according to claim 4, wherein the controller inputs, into the polarization adjustment element, the drive signal in which a first signal, and a second signal having a signal level that differs from that of the first signal, repeat in an alternating manner, in a first period in which the first signal is input, the polarization adjustment element allows transmittance of only a linearly polarized light component having a polarization direction orthogonal to the excitation light incident on the sample and, in a second period in which the second signal is input, the polarization adjustment element allows transmittance of only a linearly polarized light component having a polarization direction that is perpendicular to the excitation light incident on the sample, the controller when the sample is the first reference sample, measures, as the degree of polarization of the first reference sample, a fluorescence intensity $A(I_\perp)$ detected by the light receiver in the first period and a fluorescence intensity $A(I_{//})$ detected by the light receiver in the second period, when the sample is the second reference samples, measures, as the degree of polarization of the second reference samples, a fluorescence intensity $B(I_\perp)$ detected by the light receiver in the first period and a fluorescence intensity $B(I_{//})$ detected by the light receiver in the second period, and calculates $$P_{BA} = \frac{(B(I_{II}) - A(I_{II})) - (B(I_\perp) - A(I_\perp))}{(B(I_{II}) - A(I_{II})) + (B(I_\perp) - A(I_\perp))} \quad \text{Equation 1}$$

to obtain the first corrected degree of polarization $P_{BA}$, and the controller when the sample is the first sample to be measured, measures, as the degree of polarization of the first sample to be measured, a fluorescence intensity $C(I_\perp)$ detected by the light receiver in the first period and a fluorescence intensity $C(I_{//})$ detected by the light receiver in the second period, when the sample is the second sample to be measured, measures, as the degree of polarization of the second sample to be measured, a fluorescence intensity $D(I_\perp)$ detected by the light receiver in the first period and a fluorescence intensity $D(I_{//})$ detected by the light receiver in the second period, and calculates $$P_{DC} = \frac{(D(I_{II}) - C(I_{II})) - (D(I_\perp) - C(I_\perp))}{(D(I_{II}) - C(I_{II})) + (D(I_\perp) - C(I_\perp))} \quad \text{Equation 2}$$

to obtain the second corrected degree of polarization $P_{DC}$.

6. The fluorescence polarization immunoassay device according to claim 4, wherein the controller inputs, into the polarization adjustment element and as the drive signal, a signal for changing a first transmitted light intensity of linearly polarized light perpendicular to the polarization direction of the excitation light and a second transmitted light intensity of linearly polarized light parallel to the polarization direction of the excitation light to a sine wave form, the polarization adjustment element changes the first transmitted light intensity and the second transmitted light intensity to reverse phases, the controller in a case in which one period of the transmitted light intensity changed to a sine wave form is evenly divided into four periods, and these periods are defined as a first period, a second period, a third period, and a fourth period, when the sample is the first reference sample, measures, as the degree of polarization of the first reference sample, average values $p_{1A}$, $p_{2A}$, $p_{3A}$, and $p_{4A}$ of a fluorescence intensity detected by the light receiver in the first period, the second period, the third period, and the fourth period, when the sample is the second reference samples, measures, as the degree of polarization of the second reference samples, average values $p_{1B}$, $p_{2B}$, $p_{3B}$, and $p_{4B}$ of a fluorescence intensity detected by the light receiver in the first period, the second period, the third period, and the fourth period, calculates $p_{xBA} = p_{xB} - p_{xA}$, where x=1, 2, 3, 4, and calculates $$P_{BA} = \frac{\sqrt{(p_{1BA} - p_{3BA})^2 + (p_{2BA} - p_{4BA})^2}}{\frac{p_{1BA} + p_{2BA} + p_{3BA} + p_{4BA}}{4}} \quad \text{Equation 3}$$

to obtain the first corrected degree of polarization $P_{BA}$, and the controller when the sample is the first sample to be measured, measures, as the degree of polarization of the first sample to be measured, average values $p_{1C}$, $p_{2C}$, $p_{3C}$, and $p_{4C}$ of a fluorescence intensity detected by the light receiver in the first period, the second period, the third period, and the fourth period, when the sample is the second sample to be measured, measures, as the degree of polarization of the second sample to be measured, average values $p_{1D}$, $p_{2D}$, $p_{3D}$, and $p_{4D}$ of a fluorescence intensity detected by the light receiver in the first period, the second period, the third period, and the fourth period, calculates $p_{xDC} = p_{xD} - p_{xC}$, where x=1, 2, 3, 4, and calculates $$P_{DC} = \frac{\sqrt{(p_{1DC} - p_{3DC})^2 + (p_{2DC} - p_{4DC})^2}}{\frac{p_{1DC} + p_{2DC} + p_{3DC} + p_{4DC}}{4}} \quad \text{Equation 4}$$

to obtain the second corrected degree of polarization $P_{DC}$.

\* \* \* \* \*